(12) United States Patent
Yanase et al.

(10) Patent No.: US 8,426,327 B2
(45) Date of Patent: *Apr. 23, 2013

(54) ALKALI-FREE GLASS AND ALKALI-FREE GLASS SUBSTRATE, AND METHOD OF PRODUCING THE SAME

(75) Inventors: Tomoki Yanase, Otsu (JP); Shinkichi Miwa, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 447 days.

This patent is subject to a terminal disclaimer.

(21) Appl. No.: 11/791,313

(22) PCT Filed: May 22, 2007

(86) PCT No.: PCT/JP2007/060418
§ 371 (c)(1),
(2), (4) Date: Jan. 8, 2009

(87) PCT Pub. No.: WO2007/136054
PCT Pub. Date: Nov. 29, 2007

(65) Prior Publication Data
US 2009/0226671 A1    Sep. 10, 2009

(30) Foreign Application Priority Data

May 23, 2006 (JP) .................. 2006-143229
May 14, 2007 (JP) .................. 2007-127853

(51) Int. Cl.
*C03C 3/091* (2006.01)
*C03C 3/093* (2006.01)

(52) U.S. Cl.
USPC ............................................. 501/67; 501/68

(58) Field of Classification Search .............. 501/66, 501/67, 70, 69, 72
See application file for complete search history.

(56) References Cited

U.S. PATENT DOCUMENTS

| | | | |
|---|---|---|---|
| 5,801,109 A | 9/1998 | Nishizawa et al. | |
| 5,811,361 A * | 9/1998 | Miwa | 501/70 |
| 6,169,047 B1 | 1/2001 | Nishizawa et al. | |
| 6,319,867 B1 * | 11/2001 | Chacon et al. | 501/66 |
| 6,465,381 B1 * | 10/2002 | Lautenschlager et al. | 501/67 |
| 6,468,933 B1 * | 10/2002 | Narita et al. | 501/56 |
| 7,524,784 B2 * | 4/2009 | Chacon et al. | 501/66 |
| 2002/0082158 A1 | 6/2002 | Chacon et al. | |
| 2002/0151426 A1 * | 10/2002 | Murata et al. | 501/66 |
| 2004/0043887 A1 * | 3/2004 | Paulson | 501/66 |
| 2005/0084440 A1 | 4/2005 | Chacon et al. | |

FOREIGN PATENT DOCUMENTS

| | | |
|---|---|---|
| JP | 9-169539 | 6/1997 |
| JP | 2001-151534 | 6/2001 |
| JP | 2002-531360 | 9/2002 |
| JP | 2004-189535 | 7/2004 |
| WO | 97/11919 | 4/1997 |

OTHER PUBLICATIONS

English translation of PCT Written Opinion mailed Dec. 24, 2008 in the International (PCT) Application PCT/JP2007/060418 of which the present application is the U.S. National Stage.

* cited by examiner

*Primary Examiner* — Karl Group
(74) *Attorney, Agent, or Firm* — Wenderoth, Lind & Ponack, L.L.P.

(57) ABSTRACT

A technical object of the present invention is to satisfy various properties required in glass for liquid crystal displays and the like, in particular, fusibility, devitrification resistance, and like properties, and then to design a glass composition in which components harmful to the environment are reduced or substantially not contained, thereby obtaining a glass substrate that takes the environment into consideration. An alkali-free glass of the present invention contains the following glass composition in percent by weight based on oxide: 50 to 70% of $SiO_2$, 10 to 20% of $Al_2O_3$, 8 to 12% of $B_2O_3$, 0 to 3% of MgO, 4 to 15% of CaO, 0 to 10% of SrO, 0 to 1% of BaO, and 0 to 5% of ZnO, and substantially free of alkali metal oxide and $As_2O_3$.

20 Claims, No Drawings

ALKALI-FREE GLASS AND ALKALI-FREE GLASS SUBSTRATE, AND METHOD OF PRODUCING THE SAME

This application is a U.S. national stage of PCT/JP2007/60418, filed May 22, 2007.

TECHNICAL FIELD

The present invention relates to an alkali-free glass and an alkali-free glass substrate suitable for substrates of liquid crystal displays, organic EL displays, etc., and cover glasses of solid state image pickup devices such as CMOS and the like.

BACKGROUND ART

Glass substrates are widely used for displays of liquid crystal displays, organic EL displays, etc., substrates of hard disks, filters, sensors, etc., cover glasses of solid state image pickup devices such as CMOS, and the like. In particular, active matrix displays in which pixels are driven by active elements, typified by thin-film transistors (hereinafter referred to as TFT(s)) form the mainstream of liquid crystal displays and organic EL displays, and are widely used in the displays for displaying color images and movie images of liquid crystal televisions, notebook computers, LCD monitors, cellular phones, and digital cameras. In such active matrix displays described above, micron-order high definition electronic circuits such as TFT elements and signal lines are formed on the surface of a glass substrate using a thin film.

The glass substrates for use in the above applications require various properties described below (see Patent-Document 1):

(1) the glass substrates are required to have substantially no alkali metal oxide because when the glass has an alkali metal oxide, alkali ions are dispersed in a film-formed semiconductor material during a heat treatment, which leads to degradation of film properties;

(2) the glass substrates are required to have chemical resistance which is not deteriorated by chemicals such as various acids, and alkalis, used in a photoetching process;

(3) the glass substrates are required to have a high strain point in such a manner that the substrates are not thermally shrinkaged by heat treatment in processes of film formation, annealing, etc;

(4) the glass substrates are required to have a small density so as to achieve lightweight displays; and (5) the glass substrates are required to be matched to the coefficient of thermal expansion of peripheral members.

In view of fusibility and formability, the following properties are also required in this kind of glass substrate:

(6) the glass substrates are required to have excellent fusibility so as to prevent fusion defects, which are undesirable for glass substrates, from occurring in the glass. In particular, there should be no bubble defects; and (7) the glass substrates are required to have excellent devitrification resistance so that foreign substances generated during fusion and formation processes do not remain in the glass.

[Patent-Document 1] Japanese Patent Application Laid-open No. 2000-302475

DISCLOSURE OF THE INVENTION

Problems to be Solved by the Invention

In recent years, demands for environmental consideration in industrial products have increased, which can be seen in the promulgation of the RoHS Directive in Europe, etc. In particular, it is requested that the content of environmental impact chemical substance in products be strictly regulated, or that the environmental impact chemical substance be not contained at all in certain products. The glass substrates for displays are no exception, and it is requested that the content of the environmental impact chemical substance in the glass substrate be reduced as much as possible or that no environmental impact chemical substance is used.

Among components contained in a glass composition, As, Sb, and the like in addition to heavy metals such as Pb, Cd, Cr, etc., are perceived as problems as the environmental impact chemical substances. As and Sb are components used as glass fining agents (anti-bubble agents, antifoaming agents) and are suitable for glass which needs to be melted at high temperatures, such as an alkali-free glass and the like. However, the use of As or Sb is not desirable in view of environmental aspects. Especially, As has high toxicity, and thus the use thereof tends to be limited strictly.

Ba is an alkaline earth metal component, and has, as a raw material, a compound which is the environmental impact chemical substance. Thus, it is desirable to reduce the amount of Ba or to contain no Ba.

Therefore, a technical object of the present invention is to satisfy various properties required in glass and the like for liquid crystal displays, in particular, fusibility, devitrification resistance, and like properties, and then design a glass composition in which components harmful to the environment are reduced or substantially not contained, thereby obtaining a glass substrate that takes the environment into consideration.

Means for Solving the Problem

The inventors of the present invention have made intensive efforts and found that the above-mentioned problems can be solved by limiting the glass composition in percent by weight based on oxide: 50 to 70% of $SiO_2$, 10 to 20% of $Al_2O_3$, 8 to 12% of $B_2O_3$, 0 to 3% of MgO, 4 to 15% of CaO, 0 to 10% of SrO, 0 to 1% of BaO, and 0 to 5% of ZnO, and making the glass composition substantially free of alkali metal oxide and $As_2O_3$. The present invention has been accomplished based on this finding. In the present invention, the phrase "containing substantially no alkali metal oxide" means that no alkali metal oxide is contained other than that originating, as impurities, from raw materials, or the like, and the content of an alkali metal oxide ($Li_2O$, $Na_2O$, $K_2O$) in a glass composition is 0.1% by weight or lower. In the present invention, the phrase "containing substantially no $As_2O_3$" means that no $As_2O_3$ is contained other than that originating, as impurities, from raw materials, or the like, and the content of $As_2O_3$ in a glass composition is 0.1% by weight or lower (preferably, 50 ppm or lower).

The alkali-free glass of the present invention has a glass composition that is strictly regulated to the above-mentioned component range, and thus can be suitably used for glass substrates of liquid crystal displays and organic EL displays. In other words, since the alkali-free glass of the present invention has a glass composition strictly regulated to the above-mentioned range, the above-mentioned requested properties (1) to (7) can be satisfied. In particular, the alkali-free glass of the present invention is excellent in fusibility and devitrification resistance, and thus can sharply improve the productivity of glass substrates.

The alkali-free glass of the present invention substantially contains no alkali metal oxide. When an alkali metal oxide is incorporated in glass substrates for use in active-matrix liquid crystal displays and organic EL displays, alkali components are dispersed in a TFT element formed on the surface of a glass substrate, resulting in that there is a possibility that abnormalities occur in the performances. Because the alkali-free glass of the present invention contains substantially no alkali metal oxide, no alkali components are dispersed in a TFT element, and thus the performances are not deteriorated.

BaO is a component for improving the chemical resistance and devitrification resistance of glass, but is an environmental impact chemical substance. Thus, it is desirable to restrict the content thereof from the environmental viewpoint. The BaO content in the alkali-free glass of the present invention is strictly regulated. More specifically, the BaO content is limited to 1% by weight or lower. Thus, the alkali-free glass of the present invention is the environmentally considerate glass. In the alkali-free glass of the present invention, the BaO content can be reduced in such a manner that BaO is not substantially contained, and therefore can further reduce influence thereof on the environment. BaO is a component which increases a density, but the BaO content in the alkali-free glass of the present invention is strictly restricted. Thus, the alkali-free glass of the present invention is advantageous also in that a low-density glass can be achieved.

In order to obtain a bubble-free glass, it is important to select a fining agent which generates fining gas within the temperature range from a vitrification reaction temperature to a homogeneous melting temperature. More specifically, glass is clarified by expelling gas generated during a vitrification reaction from a glass melt using a fining gas. In addition, the remaining minute bubbles must be removed during homogenization melting by the reproduced fining gas which renders the minute bubbles larger in sizes and thereby float in the melt. With respect to an alkali-free glass for use in glass substrates for liquid crystal displays, the viscosity of glass melt is high. Thus, such an alkali-free glass for use in glass substrates for liquid crystal displays is melted at higher temperatures compared with glass containing an alkali component. Heretofore, $As_2O_3$ which generates fining gas in a wide temperature range (about 1200° C. to 1600° C.) has been widely used as a fining agent. However, $As_2O_3$ has extremely strong toxicity, and thus may pollute the environment during glass manufacturing process, waste glass treatments, or the like. Therefore, the use of $As_2O_3$ is being restricted. In contrast, because the alkali-free glass of the present invention does not use $As_2O_3$ as a fining agent, a situation where the environment is polluted can be avoided as much as possible.

Secondly, the alkali-free glass of the present invention is characterized by containing the following glass composition in terms of % by weight based on oxide: 50 to 70% of $SiO_2$, 10 to 20% of $Al_2O_3$, 8 to 12% of $B_2O_3$, 0 to 3% of MgO, 4 to 15% of CaO, 0 to 10% of SrO, 0 to 1% of BaO, and 0 to of 5% ZnO, and substantially not containing alkali metal oxides, $As_2O_3$, and $Sb_2O_3$. In the present invention, the phrase "containing substantially no $Sb_2O_3$" means that $Sb_2O_3$ is not contained other than that originating, as impurities, from raw materials, or the like, and the content of $Sb_2O_3$ in a glass composition is 0.05% by weight or lower.

Third, an alkali-free glass of the present invention is characterized by containing the following glass composition in terms of % by weight based on oxide: 50 to 70% of $SiO_2$, 10 to 20% of $Al_2O_3$, 8 to 12% of $B_2O_3$, 0 to 3% of MgO, 4 to 15% of CaO, 0 to 10% of SrO, 0 to 0.2% of BaO, and 0 to 5% of ZnO, and containing substantially free of alkali metal oxide and $As_2O_3$.

Fourth, the alkali-free glass of the present invention is characterized by containing the following glass composition in terms of % by weight based on oxide: 55 to 65% $SiO_2$, 12 to 20% of $Al_2O_3$, 8 to 12% of $B_2O_3$, 0 to 2% of MgO, 5 to 12% of CaO, 1 to 10% of SrO, 0 to 5% of ZnO, and 5 to 20% of RO, and substantially not containing alkali metal oxides such as BaO and $As_2O_3$. In the present invention, "RO" refers to a total amount of MgO, CaO, SrO, and ZnO (MgO+CaO+SrO+ZnO). In the present invention, the phrase "containing substantially no BaO" means that BaO is not contained other than that originating, as impurities, from raw materials, or the like, and the content of BaO in a glass composition is 0.1% by weight or lower.

Fifth, an alkali-free glass of the present invention is characterized by containing the following glass composition in terms of % by weight based on oxide: 55 to 65% of $SiO_2$, 12 to 20% of $Al_2O_3$, 8 to 12% of $B_2O_3$, 0 to 2% of MgO, 5 to 12% of CaO, 1 to 10% of SrO, 0 to 5% of BaO, 0 to 5% of ZnO, and 5 to 20% of RO, and containing substantially free of alkali metal oxide, BaO, and $As_2O_3$.

Sixth, an alkali-free glass of the present invention is characterized by containing the following glass composition in terms of % by weight based on oxide: 55 to 65% of $SiO_2$, 12 to 20% of $Al_2O_3$, 8 to 11% of $B_2O_3$, 0 to 1% of MgO, 6 to 11% of CaO, 3 to 10% of SrO, 0 to 5% of ZnO, and 7 to 20% of RO, and containing substantially free of alkali metal oxide, BaO, $As_2O_3$, and $Sb_2O_3$.

Seventh, an alkali-free glass of the present invention is characterized by containing the following glass composition in terms of % by weight based on oxide: 55 to 65% of $SiO_2$, 13 to 17% of $Al_2O_3$, 8.5 to 10.5% of $B_2O_3$ (10.5% exclusive), 0 to 0.5% of MgO (0.5% exclusive), 6.5 to 11% of CaO, 3 to 7% of SrO, 0 to 1% of ZnO, and 7 to 20% of RO, and containing substantially free of alkali metal oxide, BaO, $As_2O_3$ and $Sb_2O_3$.

Eighth, an alkali-free glass substrate of the present invention is characterized by being formed of the above-mentioned alkali-free glass.

Ninth, the alkali-free glass substrate of the present invention is characterized by having an average surface roughness (Ra) of 20 Å or lower. In the specification, the "average surface roughness (Ra)" refers to a value measured by a method according to SEMI D7-94 "FPD glass substrate surface roughness measurement method".

Tenth, the alkali-free glass substrate of the present invention has waviness of 0.1 μm or lower. In the specification, the "waviness" refers to a value obtained by measuring WCA (filtered centerline waviness) described in JIS B-0610. The measurement is performed by a method according to SEMI STD D15-1296 "FPD glass substrate surface waviness measurement". The measurement cut-off is 0.8 to 8 mm and the sample is measured at a length of 300 mm in the direction perpendicular to the drawing direction of the glass substrate.

Eleventh, the alkali-free glass substrate of the present invention is characterized by having a plate thickness difference between the maximum plate thickness and the minimum plate thickness of 20 μm or lower. In the specification, the "plate thickness difference between the maximum plate thickness and the minimum plate thickness" refers to a value obtained by subtracting a value of the minimum plate thickness from a value of the maximum plate thickness. The maximum plate thickness and the minimum plate thickness of a glass substrate are measured using a laser thickness measuring device by scanning a laser beam onto one side of the glass substrate from the plate thickness direction.

Twelfth, the alkali-free glass substrate of the present invention is characterized by having an error of target thickness of 10 μm or lower. In the specification, the "error of target thickness" refers to a higher value between absolute values obtained by subtracting the maximum plate thickness or the minimum plate thickness, which are obtained by the above-mentioned method, from the target plate thickness.

Thirteenth, the alkali-free glass substrate of the present invention is characterized by being used for a display.

Fourteenth, the alkali-free glass substrate of the present invention is characterized by being used for a liquid crystal display or an organic EL display.

Fifteenth, the alkali-free glass substrate of the present invention is characterized by being used for a liquid crystal display for flat televisions.

Sixteenth, a method of manufacturing the alkali-free glass of the present invention is characterized in that an overflow downdraw glass forming method (also referred to as fusion method) is adopted as a formation method.

BEST MODE FOR CARRYING OUT THE INVENTION

The reason why the composition range is limited as described above will be described in detail below. In the following description, unless otherwise specified, "%" means "% by weight".

$SiO_2$ is a glass-network forming component and the content is 50 to 70%, preferably 55 to 68%, more preferably 55 to 65%, still more preferably 57.5 to 61.5%, and particularly preferably 58 to 61.5%. When the $SiO_2$ content is less than 50%, the chemical resistance, especially acid resistance, is deteriorated and it is difficult to achieve low density glass. When the $SiO_2$ content is higher than 70%, the high temperature viscosity increases and fusibility is deteriorated. Moreover, the devitrification of cristobalite is easy to occur, and defects due to devitrification foreign substance in glass are easy to occur.

$Al_2O_3$ is a component having effects of increasing the strain point of glass and improving the Young's modulus of glass. The $Al_2O_3$ content is 10 to 20%, preferably 12 to 18%, more preferably 13 to 17%, and still more preferably 14.5 to 17%. When the $Al_2O_3$ content is less than 10%, the liquidus temperature rises and devitrification foreign substances of cristobalite are easy to generate in glass. In addition thereto, the strain point is easily lowered. Moreover, when the $Al_2O_3$ content is higher than 20%, the buffered hydrofluoric acid resistance (hereinafter, referred to as BHF resistance) is lowered. The glass surface easily become cloudy, and $SiO_2$—$Al_2O_3$—RO devitrifications such as anorthite easily arises in glass, which are not desirable.

$B_2O_3$ is a component that functions as a flux, lowers the viscosity of glass, and improves the fusibility of glass. The content thereof is 8 to 12%, preferably 8 to 11%, more preferably 8.5 to 11%, still more preferably 8.5 to 10.5% (10.5% exclusive), and particularly preferably 9 to 10.5% (10.5% exclusive). When the $B_2O_3$ content is less than 8%, the function as a flux is not sufficiently demonstrated and the BHF resistance is deteriorated, and moreover the devitrification resistance is also lowered. When the $B_2O_3$ content is higher than 12%, the strain point is lowered and the heat resistance is lowered, and moreover the acid resistance tends to be deteriorated.

BaO is a component for improving the chemical resistance and devitrification resistance of glass, but is an environmental impact chemical substance. Thus, it is desirable to restrict the content thereof from the environmental viewpoint. More specifically, the BaO content needs to be limited to the range of: 0 to 1%, preferably 0 to 0.6%, more preferably 0 to 0.5% (0.5% exclusive), and still more preferably 0 to 0.2%. From the viewpoint of environmental consideration, glass containing no BaO is particularly preferable. When the BaO content is higher than 1%, a heavy load is applied to the environment, and it is difficult to achieve a low density glass.

SrO is a component that improves the chemical resistance of glass and also alleviate the devitrification property of glass. In contrast, SrO also lowers the high temperature viscosity. However, among all alkali earth metal oxides, the effect of improving fusibility is small. When a large amount of SrO is contained, there is a tendency that the viscosity and the coefficient of thermal expansion increase. Therefore, the SrO content is 0 to 10%, preferably 1 to 10%, more preferably 3 to 10%, still more preferably 3 to 8%, and particularly preferably 3 to 7%. When the SrO content is higher than 10%, there is a possibility that the density and the coefficient of thermal expansion excessively increase.

MgO is a component that lowers the high temperature viscosity of glass and improves the fusibility of glass, and also is a most efficient component among alkali earth metal oxides in lowering the density. When a large amount of MgO is contained, however, liquidus temperatures increase and formability is deteriorated. Moreover, there is a possibility that MgO reacts with BHF to form a product, and then the product adheres to an element of the surface of a glass substrate or adheres to a glass substrate, with the result that the glass substrate becomes cloudy. Therefore, it is preferable to limit the MgO content. More specifically, the content is 0 to 3%, preferably 0 to 2%, more preferably 0 to 1.9%, still more preferably 0 to 1%, yet still more preferably 0 to 0.5%, and particularly preferably 0 to 0.5% (0.5% exclusive). It is most preferable that MgO be not substantially contained. When the MgO content is higher than 3%, the devitrification property of glass is deteriorated, and it is difficult to adopt the overflow down draw glass forming method. In addition, there is a possibility that the BHF resistance is deteriorated. In the specification, the phrase "containing substantially no MgO" means that MgO is not contained other than that originating, as impurities, from raw materials, or the like, and the content of MgO in a glass composition is 0.1% by weight or lower.

CaO has effects of lowering the high temperature viscosity of glass, improving the fusibility of glass, and alleviating the devitrification resistance of glass. CaO is an essential ingredient in the alkali-free glass of the present invention. Moreover, CaO is a component that improves the Young's modulus of glass best among bivalent alkali earth metal oxides and inhibits the elevation of glass density. CaO is a component that can impart properties suitable for glass substrates for use in liquid crystal displays. MgO also has the same effects as those of CaO, but the devitrification resistance of MgO is easily deteriorated and only a small amount of MgO can be contained. Considering the above, it is important in the alkali-free glass of the present invention that the CaO content is relatively higher. Therefore, in the alkali-free glass of the present invention, the CaO content is 4 to 15%, preferably 5 to 12%, more preferably 6 to 11%, still more preferably 6.5 to 9%, and particularly preferably 7 to 9%. When the CaO content is less than 4%, there is a possibility that the above-mentioned effects cannot sufficiently be obtained. When the CaO content is higher than 15%, the BHF resistance is deteriorated and the surface of a glass substrate is easy to be eroded, and in addition, a reaction product adheres to the surface of a glass substrate, with the result that the glass may become cloudy.

ZnO is a component that improves the BHF resistance of glass and improves the fusibility of glass. When the ZnO content is higher than 5%, however, the glass is easily devitrified. When the ZnO content is higher than 5%, the strain point is lowered. This makes the glass difficult to achieve a desired heat resistance. The influence of ZnO on the environment is not high, but ZnO may be treated as a substance similar to an environmental impact chemical substance, and thus it is desirable to reduce the ZnO content as much as possible. More specifically, the ZnO content is preferably 5% or lower, more preferably 2% or lower, still more preferably 1% or lower, and particularly preferably 0.5% or lower. It is ideal that ZnO be not contained. In the specification, the phrase "containing substantially no ZnO" means that ZnO is not contained other than that originating, as impurities, from raw materials, or the like, and the content of ZnO in a glass composition is 0.1% by weight or lower.

By mixing an alkali earth metal oxide to be incorporated, the liquidus temperature of glass is effectively lowered (i.e., crystal debris is difficult to form in glass) and the effects of improving the fusibility of glass and the formability of glass can be obtained. However, when the components are contained in a large amount, the density of glass is increased, which makes it difficult to obtain a light-weight glass substrate. Therefore, the total amount of the components is preferably 5 to 20%, more preferably 8 to 15%, and still more preferably 10 to 15%. However, it is desirable that BaO and MgO be not substantially contained for the above-mentioned reasons.

$ZrO_2$ is a component that improves the chemical resistance of glass, especially acid resistance. However, when the $ZrO_2$ content is higher than 5%, the liquidus temperature is raised, and thus it is likely to generate devitrification debris of zircon. Thus, such $ZrO_2$ content is not desirable. Therefore, the $ZrO_2$ content is preferably 0 to 5%, more preferably 0 to 1%, and more preferably 0.01 to 0.5%. As a source of introducing $ZrO_2$, a raw material containing $ZrO_2$ as a main component may be used. Alternatively, $ZrO_2$ may be incorporated using elution from a refractory substance and the like which forms a glass melting furnace.

$TiO_2$ is a component that improves the chemical resistance of glass, especially acid resistance, and that also lowers a high temperature viscosity and improves fusibility. $TiO_2$ is also effective in preventing coloration due to ultraviolet rays. However, when the $TiO_2$ content is higher than 3%, glass is discolored, and thus the transmission of a glass substrate is lowered. Therefore, it is difficult to use such glass for display applications. Therefore, it is desirable that $TiO_2$ be contained in a small amount, and specifically, the $TiO_2$ content is preferably 0 to 3% and more preferably 0 to 1%.

The alkali-free glass of the present invention can contain another component up to 5% insofar as the properties, which are features of the present invention, are not adversely affected. For example, $Y_2O_3$, $Nb_2O_5$, $WO_3$, etc., can be contained within 5% or less. These components have effects of improving the devitrification resistance and/or improving the Young's modulus.

The alkali-free glass of the present invention has a feature that an alkali metal oxide is not substantially contained. When an alkali metal oxide is incorporated in glass substrates for use in active matrix liquid crystal displays and organic EL displays, there is a fear that alkali components are dispersed in a TFT element formed on the surface of the glass substrate, and the performance thereof is deteriorated. Thus, alkali-free-glass substrates which do not substantially contain alkali metal oxides are for glass substrates used for the applications.

As described above, $As_2O_3$ has been widely used as a glass fining agent, but the alkali-free glass of the present invention does not substantially contain $As_2O_3$ from the viewpoint of environmental consideration. Moreover, it is preferable that the alkali-free glass of the present invention may not substantially contain $Sb_2O_3$ as a fining agent. Although $Sb_2O_3$ has lower toxicity in comparison with $As_2O_3$, but $Sb_2O_3$ is an environmental impact chemical substance. Thus, it is preferable to restrict the use thereof from the viewpoint of environmental consideration. Halogen such as F, Cl, and the like is added as a glass flux, but the volatile matter generated at the time of glass melting has toxicity. Thus, it is preferable that the halogen content be reduced and halogen be not substantially contained. In the specification, the phrase "halogen such as F, Cl, and the like is not substantially contained" means that such halogen is not contained other than that originating, as impurities, from raw materials, or the like, and the content of halogen such as F, Cl, and the like in a glass composition is 0.05% by weight or lower.

It is preferable that the alkali-free glass of the present invention contain $SnO_2$ as a fining agent, and the $SnO_2$ content is preferably 0 to 1%, more preferably 0.01 to 0.5%, and still more preferably 0.05 to 0.3%. $SnO_2$ can produce a large amount of fining gas by a valence change in Sn ions which occur in a high temperature range. In general, because the melting point of the alkali-free glass is higher than that of an alkali-containing glass, $SnO_2$ can be suitably used as a fining agent. On the other hand, when the $SnO_2$ content is higher than 1%, there is a fear that the devitrification resistance of glass may be deteriorated. As a source of introducing $SnO_2$, a raw material containing $SnO_2$ as a main component may be used. Alternatively, $SnO_2$ may be incorporated using elution and the like from an electrode and the like placed in a glass melting furnace. As described later, when the $SnO_2$ content is high, the devitrification resistance of glass is deteriorated. Therefore, considering the devitrification resistance of glass, the $SnO_2$ content is preferably 0.3% or lower.

$SO_3$, metal powder of C, Al, and Si, or the like can be used as a fining agent insofar as the glass properties, which are features of the present invention, are not adversely affected. $CeO_2$, $Fe_2O_3$, and the like can also be used as a fining agent, but there is a fear that glass is discolored. Thus, it is preferable that the content thereof is 0.1% or lower.

In the above-mentioned range of the glass composition, it is naturally possible to combine a desirable content range of each component freely and select a desirable glass composition range. Among various glass compositions, it is more preferable that an alkali-free glass contain the following glass composition in terms of % by weight based on oxide: 55 to 65% of $SiO_2$, 12 to 20% of $Al_2O_3$, 8 to 12% of $B_2O_3$, 0 to 2% of MgO, 5 to 12% of CaO, 1 to 10% of SrO, 0 to 5% of ZnO, and 5 to 20% of RO, and substantially do not contain alkali metal oxide, BaO, and $As_2O_3$.

It is still more preferable that an alkali-free glass contain the following glass composition in terms of % by weight based on oxide: 55 to 65% of $SiO_2$, 12 to 20% of $Al_2O_3$, 8 to 12% of $B_2O_3$, 0 to 2% of MgO, 5 to 12% of CaO, 1 to 10% of SrO, 0 to 5% of ZnO, and 5 to 20% of RO, and do not substantially contain alkali metal oxide, BaO, $As_2O_3$, and $Sb_2O_3$. In addition, it is also preferable that an alkali-free glass contain the following glass composition in terms of % by weight based on oxide: 55 to 65% of $SiO_2$, 12 to 20% of $Al_2O_3$, 8 to 11% of $B_2O_3$, 0 to 1% of MgO, 6 to 11% of CaO, 3 to 10% of SrO, 0 to 5% of ZnO, and 7 to 20% of RO, and do not substantially contain alkali metal oxide, BaO, $As_2O_3$, and $Sb_2O_3$. In addition, it is preferable that an alkali-free glass contain the following glass composition in terms of % by weight based on oxide: 57.5 to 61.5% of $SiO_2$, 14.5 to 17% of $Al_2O_3$, 8.5 to 11% of $B_2O_3$, 0 to 0.5% of MgO, 0 to 0.6% of BaO, 6 to 9% of CaO, 3 to 7% of SrO, and 0 to 1% of ZnO, and do not substantially contain alkali metal oxide, $As_2O_3$, and $Sb_2O_3$. With excellent fusibility and devitrification resistance, such an alkali-free glass not only can improve the productivity of glass substrates but also is suitable for the overflow downdraw glass forming method in which the viscosity at the time of glass formation is high.

It is particularly preferable that an alkali-free glass contain the following glass composition in terms of % by weight based on oxide: 55 to 65% of $SiO_2$, 13 to 17% of $Al_2O_3$, 8.5 to 10.5% of $B_2O_3$ (10.5% exclusive), 0 to 0.5% of MgO (0.5% exclusive), 6.5 to 11% of CaO, 3 to 7% of SrO, 0 to 1% of ZnO, and 7 to 20% of RO, and do not substantially contain alkali metal oxide, BaO, $As_2O_3$, and $Sb_2O_3$. Because such an alkali-free glass does not substantially contain BaO, $As_2O_3$, and $Sb_2O_3$, influences on the environment can be sharply reduced. Thus, such an alkali-free glass is suitable as a next-generation glass substrate that takes the environment into consideration. Since such an alkali-free glass do not substantially contain BaO, $As_2O_3$, and $Sb_2O_3$, recycling of glass substrates can be easily achieved.

In order to form an alkali-free glass into a thin plate and stably manufacture a glass substrate, the glass is required to have excellent devitrification resistance. A most typical method of forming glass substrates for use in liquid crystal displays and/or organic EL displays is the overflow downdraw glass forming method. According to the overflow downdraw glass forming method, glass substrates whose surfaces are very smooth and which have large areas and thin thicknesses can be manufactured even if the surfaces are not polished. Therefore, the overflow downdraw glass forming method is most suitable as a method of forming glass substrates for use in active-matrix liquid crystal displays. In contrast, a float method is well known as a process of forming an windowpane-plate. However, according to the process at the time of forming a thin glass substrate, stripe-like unevenness are formed in the direction parallel to the drawing direction of the glass. There is a possibility that the stripes on the glass substrate will have a serious impact on the image quality of displays such as image deformation or non-uniform display due to thickness changes in the liquid crystal layer between glass substrates. In view of such circumstances, when glass substrates formed according to the float method are used as glass substrates for active-matrix liquid crystal displays, unevenness need to be removed by a polishing process. However, there is a possibility that the polishing process will result in increasing the cost and that minute cracks formed on the surface of the glass substrate by the polishing process may cause disconnection of an electronic circuit formed on the glass substrate during a process of manufacturing active-matrix liquid crystal displays.

An important property of glass for adopting the overflow downdraw glass forming method is the devitrification resistance. In the specification, the devitrification means that crystalline foreign substances precipitate inside and on the surface of glass during a process of cooling glass raw materials that melt at high temperatures for forming glass. Such a crystalline foreign substance blocks light, and therefore becomes a fatal defect as a glass substrate for displays. According to the overflow downdraw glass forming method, a glass forming temperature is lower compared with the float method, even when the same glass composition is used. Therefore, in order to apply the overflow downdraw glass forming method, it is indispensable to design a glass composition in such a manner that the devitrification is unlikely to occur in glass, and an excellent devitrification resistance is achieved. Specifically, in view of a glass forming temperature, the liquidus viscosity of glass is preferably $10^{5.2}$ dPa·s or higher, more preferably $10^{5.5}$ dPa·s or higher, and still more preferably $10^{5.8}$ dPa·s or higher. The liquidus temperature is preferably 1200° C. or lower, more preferably 1150° C. or lower, still more preferably 1100° C. or lower, and particularly preferably less than 1100° C. When the liquidus viscosity of glass is less than $10^{5.2}$ dPa·s, the overflow downdraw glass forming method cannot be adopted, resulting in that methods of forming glass are unduly limited. This makes it difficult to secure surface qualities of glass substrates. Similar to the above, when the liquidus temperature of glass is higher than 1200° C., the overflow downdraw glass forming method cannot be adopted, resulting in that methods of forming glass are unduly limited. This makes it difficult to secure surface qualities of glass substrates. In the specification, the "liquidus viscosity" of the present invention refers to a value obtained by measuring the glass viscosity at a liquidus temperature by a well-known platinum ball pulling-up method. The "liquidus temperature" refers to the maximum temperature at which devitrification (crystalline foreign substance) is observed in glass. The measurement of the liquidus temperature is performed by crushing glass, passing the crushed glass through a standard 30-mesh sieve (500-μm openings), placing the remaining glass powders on a 50-mesh standard sieve (300-μm openings) in a platinum boat, and holding the same in a temperature gradient furnace for 24 hours.

The alkali-free glass of the present invention contains glass composition in terms of % by weight based on oxide of 0 to 0.3% of $SnO_2$, and the liquidus temperature of the glass to be obtained is preferably 1150° C. or lower and more preferably 110° C. or lower when $SnO_2$ is added until the $SnO_2$ content reaches 0.3% as the glass composition. An internal defect such as a bubble, in glass is a fatal defect as a glass substrate for displays because transmission of light is blocked. In general, as a glass substrate is enlarged, the probability that bubbles remain becomes higher and the possibility that the glass substrate to be obtained is poor and has a defect due to the remaining bubbles, which results in reduced productivity of glass substrates. Therefore, a technique of reducing bubbles in glass is important. Mentioned as methods of reducing bubbles contained in glass are a method using a fining agent and a method of lowering the high temperature viscosity. In the former method, $As_2O_3$ is the most effective one as a fining agent for an alkali-free glass. However, since $As_2O_3$ is an environmental impact chemical substance as described above, the use thereof needs to be reduced. Then, the use of $SnO_2$ has been examined as an alternative fining agent of $As_2O_3$ from the viewpoint of the environmental consideration. However, $SnO_2$ is likely to form crystalline foreign substances (devitrification), which may result in an internal defect of a glass substrate. In the case of glass in which devitrification due to $SnO_2$ is unlikely to occur, even if $SnO_2$ is introduced as a fining agent, devitrification resulting from the introduction of $SnO_2$ is unlikely to occur. Thus, the production efficiency of glass substrates can be improved and the environmental consideration can be achieved simultaneously. Therefore, such glass is very effective. Moreover, during the manufacturing process of a glass substrate, because the situation where an Sn electrode is eluted into glass is assumed to some extent, the glass in which devitrification due to $SnO_2$ is unlikely to occur is more advantageous. In this regard, according to the alkali-free glass of the present invention, even when the $SnO_2$ content in the glass composition reaches 0.3%, the liquidus temperature of the glass to be obtained can be adjusted to be 1150° C. or lower. Therefore, the alkali-free glass of the present invention can enjoy the above-mentioned effects to the maximum extent. In contrast, in the case where the $SnO_2$ content in the glass composition reaches 0.3%, when the liquidus temperature of the glass to be obtained is higher than 1150° C., it is difficult to enjoy the above-mentioned effects. In the specification, "the liquidus temperature of the glass to be obtained when $SnO_2$ is added until the content of $SnO_2$ reaches level of 0.3%" refers to a temperature at which crystals are precipitated. The measurement of the temperature is performed by adding $SnO_2$ to a raw material batch until the content of $SnO_2$ reaches 0.3% in the glass composition (in terms of 100% of glass composition being the total), melting and forming glass, crushing the obtained glass sample, passing the crushed glass sample through a 30-mesh standard sieve (500-μm openings), placing the remaining glass powders on a 50-mesh standard sieve mesh (300-μm openings) in a platinum boat, and holding the same in a temperature gradient furnace for 1 week.

In the alkali-free glass of the present invention, when 0.5% of $ZrO_2$ is added to the glass composition, the liquidus temperature of the glass to be obtained is preferably 1150° C. or lower and more preferably 1100° C. or lower. As measures for lowering the manufacturing cost of a glass substrate, besides reducing the internal defects such as a bubbles and debris, it is effective to lengthen the life of a melting furnace, thereby reducing repair frequencies of the furnace. As measures thereof, it is preferable to use Zr refractory substances which are unlikely to be eroded due to molten glass. However, as the number of places where the Zr refractory substances are used is increased, Zr crystalline foreign substances (devitrification) are likely to form, which may result in internal defects of glass substrates. Therefore, in the case of glass in which devitrification due to $ZrO_2$ is unlikely to occur, even when the Zr refractory substance is used as a refractory substance for the melting furnace, devitrification resulting from this is unlikely to occur. Therefore, the use of such glass can reduce the manufacturing costs of glass substrates, and thus is very effective. In this regard, according to the alkali-free glass of the present invention, even when 0.5% of $ZrO_2$ is added to the glass composition, the liquidus temperature of the glass to be obtained can be 1150° C. or lower. Therefore, the alkali-free glass of the present invention can enjoy the above-mentioned effects to the maximum extent. In contrast, in case where 0.5% of $ZrO_2$ is added to the glass composition, when the liquidus temperature of the glass to be obtained is higher than 1150° C., it is difficult to enjoy the above-mentioned effects. In the specification, "the liquidus temperature of the glass to be obtained when 0.5% of $ZrO_2$ is added to the glass composition" refers to a temperature at which crystals are precipitated. The measurement of the temperature is performed by adding $ZrO_2$ in an amount equivalent to 0.5% to a raw material batch in the glass composition (in terms of 100.5% of glass composition being the total apparently), melting and forming glass, crushing the obtained glass sample, passing the crushed glass sample through a 30-mesh standard sieve (500-μm openings), placing the remaining glass powders on a 50-mesh standard sieve mesh (300-μm openings) in a platinum boat, and holding the same in a temperature gradient furnace for 1 week.

In the alkali-free glass of the present invention, the coefficient of thermal expansion is preferably 30 to $50 \times 10^{-7}$/° C., and more preferably 35 to $45 \times 10^{-7}$/° C. Heretofore, it has been considered to be preferable that the coefficient of thermal expansion of the alkali-free glass substrate be matched to the coefficient of thermal expansion of a-Si or p-Si formed on a glass substrate. Specifically, the coefficient of thermal expansion of $35 \times 10^{-7}$/° C. or lower has been considered to be desirable. However, on the surfaces of liquid crystal displays or glass substrates for organic EL displays, not only a-Si or p-Si film but also, SiNx with a lower coefficient of thermal expansion, metallic wiring with higher coefficient of thermal expansion such as Cr, Ta, or Al, and ITO are formed. From the viewpoint of matching the coefficient of thermal expansion of the alkali-free glass to the coefficients of thermal expansion of those members, it was found that it is not necessarily sufficient that the coefficient of thermal expansion of the alkali-free glass is always low. More specifically, the alkali-free glass has a proper range of the coefficient of thermal expansion, and specifically, the coefficient of thermal expansion is preferably 30 to $50 \times 10^{-7}$/° C., more preferably 34 to $45 \times 10^{-7}$/° C., still more preferably 35 to $45 \times 10^{-7}$/° C., and particularly preferably 36 to $40 \times 10^{-7}$/° C. When the coefficient of thermal expansion of the alkali-free glass falls within the range, the coefficient of thermal expansion of the alkali-free glass is matched to the coefficients of thermal expansion of various films, and the thermal shock resistance can be also improved. However, when the coefficient of thermal expansion is outside the range, the coefficient of thermal expansion of the alkali-free glass may not be matched to those of various films and moreover the thermal shock resistance may be deteriorated. In the specification, "the coefficient of thermal expansion in the temperature range of 30 to 380° C." refers to a value obtained by determining the average coefficient of thermal expansion at 30 to 380° C. with a dilatometer according to JIS R3102.

In the alkali-free glass of the present invention, the density is preferably 2.54 g/cm$^3$ or lower, more preferably 2.50 g/cm$^3$ or lower, and still more preferably less than 2.50 g/cm$^3$, and particularly preferably 2.47 g/cm$^3$ or lower. Thin and light-weight liquid crystal displays and organic EL displays have been demanded, and similarly, thin and light-weight glass substrates have been demanded. Therefore, thin glass substrates having a thickness of 0.4 to 0.7 mm are mainly used for the applications and also glass having low density is also demanded in order to achieve light weight panels. As the density of a glass substrate is lower, the weight of glass is lighter. Thus, such glass is suitable for use in mobile equipment. When the density is excessively made small, fusibility and devitrification resistance are deteriorated. This makes it difficult to obtain glass substrates with large areas that are free from defects such as bubbles and unevenness. From the viewpoint of stably manufacturing glass substrates for flat television and the like, glass substrates with excessively small density are not desirable. Therefore, considering other properties, the density must be set to 2.40 g/cm$^3$ or more (preferably 2.44 g/cm$^3$ or more, 2.45 g/cm$^3$ or more). In the specification, the "density" of the present invention refers to a value measured by well-known Archimedes, method according to JIS Z8807.

In the alkali-free glass of the present invention, the strain point is preferably 620° C. or higher, more preferably 630° C. or higher, still more preferably 635° C. or higher, and particularly preferably 650° C. or higher. In the process of forming electronic circuits such as TFT and wiring, a transparent conductive film, insulating film, semiconductor film, metal film, etc., are formed on the glass substrate, and moreover various circuits and patterns are formed by a photo lithography etching process. In the film formation and photo lithography etching processes, the glass substrate is subjected to various heat treatments and chemical treatments. For example, in the active-matrix liquid crystal display, the insulating film and transparent conductive film are formed on the glass substrate, and moreover a large number of TFTs of amorphous silicone or polycrystalline silicon are formed on the glass substrate through a photo lithography etching process. During the processes, the glass substrate is subjected to heat treatment at 300 to 600° C. The glass substrate may induce dimensional change of about several ppm (several micrometers relative to 1 m in linear dimension of the glass substrate: generally the dimensional change is referred to as thermal shrinkage) due to the heat treatment. When the thermal shrinkage of the glass substrate is large, the pattern of TFT shifts. Thus, it is impossible to form a component accurately in which multilayer thin films are laminated. In order to render the thermal shrinkage small, it is effective to improve the heat resistance of glass, and specifically raise the strain point. However, when the strain point is excessively raised, temperatures at the time of melting or forming the glass substrate are increased and loads on a glass manufacturing facility is increased, which may become a factor of increased costs. Therefore, considering other properties, the strain point is adjusted to 680° C. or lower, especially 670° C. or lower.

Because alkali-free glasses do not contain an alkali metal oxide having a high effect as a flux component, advanced melting techniques are required. Mentioned as methods of melting alkali-free glasses are methods of optimizing melting facilities and melting conditions such as increasing the temperature of a melting furnace, and methods of lowering the fusing point of glass in such a manner as to facilitate melting glass. In the latter method, temperature at a high-temperature viscosity of $10^{2.5}$ dpa·s is referred to as an index of the fusibility of glass, and it is easy to melt glass as temperatures at a high-temperature viscosity of $10^{2.5}$ dPa·s are lower. In the alkali-free glass of the present invention, the temperatures at a high-temperature viscosity of $10^{2.5}$ dPa·s are preferably 1600° C. or lower, more preferably 1580° C. or lower, still more preferably 1560° C. or lower, yet still more preferably 1550° C. or lower, and particularly preferably 1540° C. or lower. When the temperature at a high-temperature viscosity of $10^{2.5}$ dPa·s is higher than 1600° C., it is required to hold the melting furnace at high temperatures for uniform melting of glass. Concomitantly, a refractory substance such as alumina, zirconia, or the like for use in the melting furnace is likely to be eroded. As a result, the life cycle of the melting furnace may be shortened, and the manufacturing cost of glass substrates may increase. If glass can be melted at low temperatures, the energy cost required for melting glass can be suppressed, and loads on the environment can be reduced. In the specification, the "temperature at a high-temperature viscosity of $10^{2.5}$ dPa·s" refers to a value measured by the well-known platinum ball pulling-up method.

When the alkali-free glass of the present invention is immersed in a 10% of aqueous HCl solution having a temperature of 80° C. for 24 hours, the amount of corrosion is preferably 1.0 mg/cm² or lower, and more preferably 0.6 mg/cm² or lower. When the alkali-free glass of the present invention is immersed in a 63BHF solution having a temperature of 20° C. for 30 minutes, the amount of corrosion is preferably 1.2 mg/cm² or lower, and more preferably 0.9 mg/cm² or lower. When the alkali-free glass of the present invention is immersed in a 63BHF solution having a temperature of 20° C. for 30 minutes, it is preferable that cloudiness and roughness be not observed when the surface is visually observed. A transparent conductive film, insulating film, semiconductor film, metal film, and the like are formed on the surface of the glass substrate for liquid crystal displays, and, moreover, various circuits and patterns are formed thereon by photo lithography etching. During the film formation and photo lithography etching processes, the glass substrate is subjected to various heat treatments and chemical treatments. In general, in a TFT array process, a series of processes containing, in the following order, a film formation process, resist pattern formation process, etching process, and resist removing process are repeated. During the process, in addition to various chemical-solution treatments using sulfuric acid, hydrochloric acid, an alkali solution, fluoric acid, BHF, and the like as an etching liquid, an etching process by plasma using gas such as $CF_4$, $S_2F_6$, and HCl is performed. The chemical solutions are not disposed but serve as liquid-based flow for circulation in view of achieving low costs. When the chemical resistance of glass is poor, the following problems may arise at the time of etching: a reaction product of a chemical solution and a glass substrate may block a filter of the liquid-based flow for circulation; the glass surface gets cloudy or the component of an etching reagent changes by inhomogeneous etching, resulting in unstable etching rate; and the like. Especially, fluoric acid chemical solutions typified by BHF seriously erode the glass substrate, and therefore the above-mentioned problems are likely to arise. Thus, the glass substrate is required to have excellent BHF resistance. More specifically, it is very important to reduce the amount of corrosion due to a chemical solution of glass from the viewpoint of preventing contamination of the chemical solution and the blocking of the filter due to the reaction product during the process. With respect to the chemical resistance of glass, it is also important that the change in appearance does not occur in addition to that the amount of corrosion is reduced. It is an indispensable property for glass substrates used for displays such as active-matrix liquid crystal displays in which transmission of light is important, that the appearance of glass is free from changes due to chemical solution treatments, such as cloudiness and roughness. Evaluation results of the amount of corrosion and the change in appearance are not necessarily in agreement, especially, in terms of BHF resistance. For example, even in glass with the same amount of corrosion, the change in appearance after a chemical treatment occurs or does not occur depending on the compositions. In this regard, even when the alkali-free glass of the present invention is immersed in a 63BHF solution having a temperature of 20° C. for 30 minutes, the amount of corrosion is of 1.2 mg/cm² or lower. Moreover, even if the alkali-free glass of the present invention is immersed in a 63BHF solution having a temperature of 20° C. for 30 minutes, cloudiness and roughness are not observed when the surface is visually observed. Therefore, the alkali-free glass of the present invention can surely overcome the above-mentioned problems.

In the alkali-free glass of the present invention, the Vickers hardness is preferably 560 or higher, more preferably 570 or higher, and still more preferably 580 or higher. When the Vickers hardness is less than 560, flaw is likely to be formed on a glass substrate, and the flaw may cause disconnection of an electronic circuit formed on the glass substrate. In the specification, the "Vickers hardness" refers to a value measured by a method according to JIS Z2244-1992.

In the alkali-free glass of the present invention, the specific modulus (value obtained by dividing the Young's modulus by the density) is preferably 27 GPa/g·cm⁻³ or higher, more preferably 28 GPa/g·cm⁻³ or higher, still more preferably 29 GPa/g·cm⁻³ or higher, and particularly preferably 29.5 GPa/g·cm⁻³. When the specific modulus is adjusted to 27 GPa/g·cm⁻³ or higher, the amount of deflection can be suppressed in such a manner that no problem arises even in large-sized thin-plate glass substrates. In the specification, the "Young's modulus" refers to a value measured by a resonance method according to JIS R1602.

It is preferable that the alkali-free glass of the present invention satisfy the relation represented by $T_3-T_4 \leq 330°$ C. when a temperature at $10^4$ dPa·s is defined as $T_3$ (° C.) and a softening temperature is defined as $T_4$ (° C.). The thickness, curvature in the plate width direction, and the shape of waviness of a glass substrate are almost determined by the time when the temperature of molten glass reaches the softening temperature from the molding temperature. Therefore, when a temperature calculated by subtracting $T_4$ from $T_3$ is low, and specifically, is preferably 330° C. or lower, more preferably 325° C. or lower, and still more preferably 320° C. or lower, it is easy to control the thickness of glass substrate, curvature in the plate width direction, and the shape of waviness of a glass substrate. When a temperature calculated by subtracting $T_4$ from $T_3$ is limited to 330° C. or lower, the viscosity increases at high rates during cooling, and the alkali-free glass of the present invention can be formed quickly into the shape of a glass substrate. When a temperature calculated by subtracting $T_4$ from $T_3$ is adjusted to 330° C. or lower, a thin glass substrate can be easily formed into a flat shape. In addition, when a temperature calculated by subtracting $T_4$ from $T_3$ is adjusted to 330° C. or lower, a large-sized glass substrate can be easily formed into a flat shape. In the case of the downdraw glass forming method, the distance inside a furnace to be subjected to slow cooling is limited in terms of the facility design. Concomitantly, period of time of slow cooling of a glass substrate needs to be limited, for example, a process of cooling the same from the molding temperature to room temperature needs to be performed in several minutes. Therefore, the above-mentioned viscosity properties are considerably advantageous. In contrast, when temperatures calculated by subtracting $T_4$ from $T_3$ are higher than 330° C., it is difficult to control the thickness, curvature in the plate width direction, and shape of waviness of a glass substrate. $T_3$ is equivalent to the molding temperature.

It is naturally possible to limit the above-mentioned glass composition ranges to a desirable glass composition range by freely combining a desirable fining agent and a desirable property. Among various glass compositions, preferable is an alkali-free glass which: substantially does not contain alkali metal oxide, $Sb_2O_3$ and $As_2O_3$; contains as the following base glass composition in percent by weight based on oxide: 50 to 70% of $SiO_2$, 10 to 20% of $Al_2O_3$, 8 to 12% of $B_2O_3$, 0 to 3% of MgO, 4 to 15% of CaO, 0 to 10% of SrO, 0 to 1% of BaO, 8 to 15% of RO, and 0.05 to 1% of $SnO_2$; and has the strain point of 630° C. or higher, density of less than 2.50 g/cm$^3$, liquidus viscosity of $10^{5.2}$ dPa·s or higher, and temperature at $10^{2.5}$ dPa·s of 1550° C. or lower.

As another preferable aspect of an alkali-free glass, the alkali-free glass: substantially does not contain alkali metal oxide, $Sb_2O_3$ and $As_2O_3$; contains the following base glass composition in percent by weight based on oxide: 58 to 68% of $SiO_2$, 14 to 18% of $Al_2O_3$, 9 to 12% of $B_2O_3$, 0 to 1.9% of MgO, 4 to 12% of CaO, 1 to 8% of SrO, 0 to 1% of BaO, and 10 to 15% of RO; and has the strain point of 630° C. or higher, density of less than 2.50 g/cm$^3$, liquidus temperature of 1100° C. or lower, liquidus viscosity of $10^{5.5}$ dPa·s or higher, temperature at $10^{2.5}$ dPa·s of 1550° C. or lower, and specific modulus of 29.5 GPa/g·cm$^{-3}$ or higher.

In liquid crystal displays and the like, a so-called multiple patterning in which several displays are manufactured from a large-sized glass substrate (referred to as mother glass) is performed. When the multiple patterning is performed, the manufacturing cost of displays can be reduced. Therefore, demanded glass substrate areas have been enlarged in recent years. In contrast, when glass substrate areas become large, the probability that a devitrification substance appears in glass substrates is increased, and thus the rate of obtaining glass substrates with good quality is sharply reduced. Therefore, the alkali-free glass substrate of the present invention with good devitrification resistance is considerably advantageous in manufacturing large-sized substrates. The alkali-free glass substrate of the present invention is more advantageous as the substrate area is larger, for example, 0.1 m$^2$ or more (specifically, size of 320 mm×420 mm or more), particularly 0.5 m$^2$ or more (specifically, size of 630 mm×830 mm or more), 1.0 m$^2$ or more (specifically size of 950 mm×1150 mm or more), 2.3 m$^2$ or more (specifically, size of 1400 mm×1700 mm or more), 3.5 m$^2$ or more (specifically, size of 1750 mm×2050 mm or more), and 4.8 m$^2$ or more (specifically, size of 2100 mm×2300 mm or more). In addition to that the alkali-free glass substrate of the present invention can impart properties, such as low density and high specific modulus, the alkali-free glass substrate of the present invention can be precisely formed into a thin-plate glass substrate. When the thickness is adjusted to 0.8 mm or lower (preferably 0.7 mm or lower, more preferably 0.5 mm or lower, still more preferably 0.4 mm or lower), the advantages (especially, weight reducing effect) of the present invention can be effectively enjoyed. The alkali-free glass substrate of the present invention can reduce the amount of deformation of the glass substrate compared with conventional glass substrates even when the thickness of the glass substrate is reduced. Therefore, it is easy to prevent damages and the like at the timing of putting the glass substrate in and out of a cassette shelf or the like.

The alkali-free glass substrate of the present invention is preferably used for liquid crystal displays for flat televisions. In recent years, there has been a tendency that the screen sizes of the liquid crystal displays for flat televisions are enlarged. The alkali-free glass substrate of the present invention can easily achieve enlargement of substrate area due to excellent productivity. Because the alkali-free glass substrate of the present invention can be formed by the overflow downdraw glass forming method, glass substrates having favorable surface qualities can be efficiently manufactured and the image qualities of liquid crystal displays for flat televisions are not deteriorated. Therefore, the alkali-free glass substrate of the present invention is suitable for the applications.

The alkali-free glass substrate of the present invention preferably has an unpolished surface. Originally the theoretical strength of glass is extremely high, but glass will break due to a stress far lower than the theoretical strength in many cases. This is because small defects, referred to as "Griffith flaw", are formed on the surface of a glass substrate in a process after a formation process, for example, in a polishing process, and the like. Therefore, when the surface of a glass substrate is not polished, the original mechanical strength of the glass substrate is difficult to be deteriorated, and the glass substrate is hard to be broken. When the surface of a glass substrate is not polished, a polishing process can be omitted in the manufacturing process of the glass substrate, thereby lowering the manufacturing cost of the glass substrate. When both entire surfaces of the alkali-free glass substrate of the present invention are not polished, the glass substrate is more difficult to be broken. With respect to the alkali-free glass substrate of the present invention, in order to prevent the breakage resulting from a cutting plane of the glass substrate, the cutting plane of the glass substrate may be subjected to chamfering and the like.

In the alkali-free-glass substrate of the present invention, the average surface roughness (Ra) of a glass substrate is preferably 10 Å or lower, more preferably 7 Å or lower, still more preferably 4 Å or lower, and most preferably 2 Å or lower. When the average surface roughness (Ra) is larger than 10 Å, it is difficult to perform accurate patterning of an electrode and the like in the manufacturing process of a liquid crystal display. As a result, the probability that a circuit electrode will be disconnected and short out is increased and it is difficult to ensure the reliability of liquid crystal displays and the like.

In the alkali-free-glass substrate of the present invention, the difference between the maximum plate thickness and the minimum plate thickness of the glass substrate is preferably 20 μm or lower and more preferably 10 μm or lower. When the difference between the maximum plate thickness and the minimum plate thickness of the glass substrate is larger than 20 μm, it is difficult to perform accurate patterning of an electrode and the like in the manufacturing process of a liquid crystal display. As a result, the probability that a circuit electrode will be disconnected and short out is increased and it is difficult to ensure the reliability of liquid crystal displays and the like.

In the alkali-free-glass substrate of the present invention, the waviness of the glass substrate is preferably 0.1 μm or lower, more preferably 0.05 μm or lower, still more preferably less than 0.03 μm, and most preferably 0.01 μm or lower. Ideally, it is desirable that the alkali-free glass substrate of the present invention be substantially free from waviness. When the waviness is larger than 0.1 μm, it is difficult to perform accurate patterning of an electrode and the like in the manufacturing process of a liquid crystal display. As a result, the probability that a circuit electrode will be disconnected and short out is increased and it is difficult to ensure the reliability of liquid crystal displays and the like.

In the alkali-free-glass substrate of the present invention, the target plate thickness error is preferably 10 μm or lower and more preferably 5 μm or lower. When the target plate thickness error is larger than 10 μm, patterning accuracies of an electrode and the like are lowered, and it is difficult to stably manufacture high-quality liquid crystal displays and the like under given conditions.

The alkali-free glass substrate of the present invention can be manufactured by pouring glass raw materials, which are adjusted to yield a desired glass composition, in a continuous melting furnace, melting the glass raw materials under heat, defoaming the resultant, supplying the resultant in a molding device, forming the molten glass into a plate shape, and gradually cooling the resultant.

From the viewpoint of manufacturing glass substrates with a favorable surface quality, it is preferable to form the alkali-free glass substrate of the present invention into a plate shape according to an overflow downdraw glass forming method. The method allows the glass substrate surface to be freely formed without contacting any gutter-shaped refractory substances, thus enabling a glass substrate with good surface quality to be formed without polishing. In the specification, the overflow downdraw glass forming method refers to a method in which a molten glass is overflowed from both sides of a refractory gutter-shaped structure, and the overflowed molten glass is subjected to downward stretching formation while being joined at the lower end of the gutter-shaped structure, thereby manufacturing a glass substrate. There is no limitation on the configurations and materials of the gutter-shaped structure, insofar as the desired dimensions and surface accuracy of the glass substrate are achieved and insofar as a level of quality, which can be used for a glass substrate for displays, can be realized. In order to perform the downward stretching formation, force may be applied to the glass substrate according to any method. For example, the method may include rolling the glass substrate to be stretched while a refractory roll with a sufficient width is brought into contact with the glass substrate or stretching the glass substrate while a plurality of pairs of refractory rolls is brought into contact with only the vicinity of the end surface of the glass substrate. The alkali-free glass of the present invention has excellent devitrification resistance and viscosity characteristics suitable for formation, and thus can be accurately formed according to the overflow downdraw glass forming method.

EXAMPLES

The present invention will be described in detail with reference to examples.

Tables 1 to 16 show Examples (sample Nos. 1 to 79) of the present invention. Table 17 shows Comparative Examples (sample Nos. 80 and 81) of the present invention.

TABLE 1

| | | Example | | | | |
|---|---|---|---|---|---|---|
| | | 1 | 2 | 3 | 4 | 5 |
| Glass composition (wt %) | $SiO_2$ | 60.0 | 60.5 | 59.5 | 59.8 | 60.7 |
| | $Al_2O_3$ | 15.3 | 15.5 | 16.0 | 15.9 | 15.3 |
| | $B_2O_3$ | 9.5 | 9.4 | 10.0 | 9.8 | 9.4 |
| | MgO | — | — | — | — | 0.3 |
| | CaO | 7.5 | 7.7 | 7.7 | 7.2 | 8.1 |
| | SrO | 6.0 | 6.4 | 6.0 | 6.6 | 6.0 |
| | ZnO | 1.0 | — | 0.5 | — | — |
| | $TiO_2$ | 0.5 | — | — | — | — |
| | $SnO_2$ | 0.2 | 0.5 | 0.3 | 0.2 | 0.2 |
| | $Y_2O_3$ | — | — | — | 0.5 | — |
| Density (g/cm³) | | 2.49 | 2.50 | 2.49 | 2.48 | 2.49 |
| Coefficient of thermal expansion [30-380° C.] ($\times 10^{-7}$/° C.) | | 39 | 40 | 39 | 39 | 39 |
| Viscosity | Strain point (° C.) | 653 | 654 | 652 | 655 | 653 |
| | Annealing temperature (° C.) | 706 | 707 | 705 | 710 | 706 |
| | Softening temperature (° C.) | 941 | 948 | 946 | 950 | 948 |
| | $10^{4.0}$ (° C.) | 1266 | 1268 | 1250 | 1270 | 1274 |
| | $10^{2.5}$ (° C.) | 1532 | 1530 | 1535 | 1535 | 1530 |
| Liquidus temperature (° C.) | | 1080 | 1090 | 1100 | 1080 | 1090 |
| Liquidus viscosity (dPa · s) | | $10^{5.8}$ | $10^{5.7}$ | $10^{5.6}$ | $10^{6.0}$ | $10^{6.1}$ |
| Devitrification resistance to Sn | | ◯ | ◯ | ◯ | ◯ | ◯ |
| Devitrification resistance to Zr | | ◯ | ◯ | ◯ | ◯ | ◯ |
| Young's modulus (GPa) | | 71 | 72 | 72 | 70 | 71 |
| Specific modulus (GPa/g · cm⁻³) | | 29 | 29 | 29 | 29 | 29 |
| Vickers hardness | | 600 | 600 | 590 | 590 | 610 |
| Corrosion amount 10% HCl 80° C. 24 hrs (mg/cm²) | | 0.4 | 0.4 | 0.5 | 0.5 | 0.4 |

TABLE 1-continued

|  | Example | | | | |
|---|---|---|---|---|---|
|  | 1 | 2 | 3 | 4 | 5 |
| Corrosion amount 63BHF 20° C. 30 min (mg/cm$^2$) | 0.8 | 0.8 | 0.7 | 0.8 | 0.8 |
| Change in appearance 63BHF 20° C. 30 min | ○ | ○ | ○ | ○ | ○ |

TABLE 2

|  |  | Example | | | | |
|---|---|---|---|---|---|---|
|  |  | 6 | 7 | 8 | 9 | 10 |
| Glass composition (wt %) | SiO$_2$ | 60.2 | 61.0 | 60.0 | 59.8 | 59.0 |
|  | Al$_2$O$_3$ | 15.5 | 15.3 | 15.7 | 15.8 | 16.1 |
|  | B$_2$O$_3$ | 9.4 | 9.4 | 10.8 | 9.0 | 10.5 |
|  | MgO | — | — | 0.3 | 0.5 | — |
|  | CaO | 6.5 | 6.5 | 8.0 | 8.0 | 6.6 |
|  | SrO | 7.2 | 6.6 | 4.5 | 6.0 | 7.2 |
|  | BaO | — | — | 0.5 | 0.2 | — |
|  | ZnO | — | 1.0 | — | — | 0.4 |
|  | TiO$_2$ | — | — | — | 0.5 | — |
|  | SnO$_2$ | 0.2 | 0.2 | 0.2 | 0.2 | 0.2 |
|  | Y$_2$O$_3$ | 1.0 | — | — | — | — |
| Density (g/cm$^3$) |  | 2.51 | 2.50 | 2.45 | 2.49 | 2.52 |
| Coefficient of thermal expansion [30-380° C.] (×10$^{-7}$/° C.) |  | 38 | 37 | 38 | 39 | 37 |
| Viscosity | Strain point (° C.) | 660 | 654 | 662 | 643 | 655 |
|  | Annealing temperature (° C.) | 715 | 708 | 714 | 696 | 712 |
|  | Softening temperature (° C.) | 955 | 950 | 943 | 950 | 955 |
|  | 10$^{4.0}$ (° C.) | 1292 | 1285 | 1261 | 1264 | 1275 |
|  | 10$^{2.5}$ (° C.) | 1556 | 1550 | 1532 | 1530 | 1540 |
| Liquidus temperature (° C.) |  | 1080 | 1070 | 1075 | 1090 | 1065 |
| Liquidus viscosity (dPa·s) |  | 10$^{5.7}$ | 10$^{6.0}$ | 10$^{5.7}$ | 10$^{5.8}$ | 10$^{6.1}$ |
| Devitrification resistance to Sn |  | ○ | ○ | ○ | ○ | ○ |
| Devitrification resistance to Zr |  | ○ | ○ | ○ | ○ | ○ |
| Young's modulus (GPa) |  | 71 | 72 | 73 | 71 | 73 |
| Specific modulus (GPa/g·cm$^{-3}$) |  | 29 | 29 | 30 | 29 | 29 |
| Vickers hardness |  | 600 | 600 | — | 610 | 610 |
| Corrosion amount 10% HCl 80° C. 24 hrs (mg/cm$^2$) |  | 0.4 | 0.4 | 0.8 | 0.4 | 0.6 |
| Corrosion amount 63BHF 20° C. 30 min (mg/cm$^2$) |  | 0.8 | 0.8 | 0.7 | 0.8 | 0.6 |
| Change in appearance 63BHF 20° C. 30 min |  | ○ | ○ | ○ | ○ | ○ |

TABLE 3

|  |  | Example | | | | |
|---|---|---|---|---|---|---|
|  |  | 11 | 12 | 13 | 14 | 15 |
| Glass composition (wt %) | SiO$_2$ | 59.5 | 59.5 | 59.5 | 59.5 | 59.5 |
|  | Al$_2$O$_3$ | 15.2 | 15.2 | 15.2 | 15.6 | 15.2 |
|  | B$_2$O$_3$ | 9.8 | 9.8 | 10.2 | 9.8 | 9.8 |
|  | CaO | 7.7 | 7.7 | 7.7 | 7.7 | 8.1 |
|  | SrO | 6.0 | 6.4 | 6.0 | 6.0 | 6.0 |
|  | ZnO | 0.4 | — | — | — | — |
|  | Sb$_2$O$_3$ | 1.0 | 1.0 | 1.0 | 1.0 | 1.0 |
|  | SnO$_2$ | 0.2 | 0.2 | 0.2 | 0.2 | 0.2 |
|  | ZrO$_2$ | 0.2 | 0.2 | 0.2 | 0.2 | 0.2 |
| Density (g/cm$^3$) |  | 2.49 | 2.50 | 2.49 | 2.49 | 2.49 |
| Coefficient of thermal expansion [30-380° C.] (×10$^{-7}$/° C.) |  | 39 | 40 | 40 | 40 | 40 |
| Viscosity | Strain point (° C.) | 664 | 666 | 664 | 669 | 664 |
|  | Annealing temperature (° C.) | 717 | 719 | 717 | 723 | 717 |
|  | Softening temperature (° C.) | 947 | 947 | 947 | 953 | 943 |

TABLE 3-continued

|  | Example | | | | |
|---|---|---|---|---|---|
|  | 11 | 12 | 13 | 14 | 15 |
| $10^{4.0}$ (° C.) | 1272 | 1267 | 1269 | 1276 | 1263 |
| $10^{2.5}$ (° C.) | 1540 | 1540 | 1543 | 1547 | 1534 |
| Liquidus temperature (° C.) | 1110 | 1116 | 1109 | 1110 | 1124 |
| Liquidus viscosity (dPa·s) | $10^{5.4}$ | $10^{5.3}$ | $10^{5.4}$ | $10^{5.5}$ | $10^{5.2}$ |
| Devitrification resistance to Sn | ○ | ○ | ○ | ○ | ○ |
| Devitrification resistance to Zr | ○ | ○ | ○ | ○ | ○ |
| Young's modulus (GPa) | 73 | 73 | 72 | 73 | 73 |
| Specific modulus (GPa/g·cm$^{-3}$) | 29 | 29 | 29 | 29 | 29 |
| Change in appearance 63BHF 20° C. 30 min | ○ | ○ | ○ | ○ | ○ |

TABLE 4

|  |  | Example | | | | |
|---|---|---|---|---|---|---|
|  |  | 16 | 17 | 18 | 19 | 20 |
| Glass composition (wt %) | SiO$_2$ | 59.5 | 59.5 | 59.5 | 58.5 | 58.5 |
|  | Al$_2$O$_3$ | 15.2 | 15.2 | 15.2 | 16.2 | 15.2 |
|  | B$_2$O$_3$ | 9.8 | 9.8 | 10.2 | 10.2 | 11.2 |
|  | CaO | 8.6 | 7.1 | 7.7 | 7.7 | 7.7 |
|  | SrO | 5.5 | 7.0 | 6.0 | 6.0 | 6.0 |
|  | Sb$_2$O$_3$ | 1.0 | 1.0 | 1.0 | 1.0 | 1.0 |
|  | SnO$_2$ | 0.2 | 0.2 | 0.2 | 0.2 | 0.2 |
|  | ZrO$_2$ | 0.2 | 0.2 | 0.2 | 0.2 | 0.2 |
| Density (g/cm$^3$) |  | 2.49 | 2.50 | 2.48 | 2.49 | 2.48 |
| Coefficient of thermal expansion [30-380° C.] (×10$^{-7}$/° C.) |  | 40 | 40 | 39 | 40 | 40 |
| Viscosity | Strain point (° C.) | 664 | 665 | 658 | 663 | 654 |
|  | Annealing temperature (° C.) | 716 | 718 | 712 | 717 | 706 |
|  | Softening temperature (° C.) | 942 | 949 | 942 | 947 | 933 |
|  | $10^{4.0}$ (° C.) | 1259 | 1276 | 1265 | 1264 | 1251 |
|  | $10^{2.5}$ (° C.) | 1534 | 1552 | 1537 | 1528 | 1528 |
| Liquidus temperature (° C.) |  | 1121 | 1121 | 1094 | 1099 | 1069 |
| Liquidus viscosity (dPa·s) |  | $10^{5.2}$ | $10^{5.4}$ | $10^{5.5}$ | $10^{5.5}$ | $10^{5.7}$ |
| Devitrification resistance to Sn |  | ○ | ○ | ○ | ○ | ○ |
| Devitrification resistance to Zr |  | ○ | ○ | ○ | ○ | ○ |
| Young's modulus (GPa) |  | 73 | 72 | 72 | 73 | 72 |
| Specific modulus (GPa/g·cm$^{-3}$) |  | 29 | 29 | 29 | 29 | 29 |
| Change in appearance 63BHF 20° C. 30 min |  | ○ | ○ | ○ | ○ | ○ |

TABLE 5

|  |  | Example | | | | |
|---|---|---|---|---|---|---|
|  |  | 21 | 22 | 23 | 24 | 25 |
| Glass composition (wt %) | SiO$_2$ | 58.5 | 57.5 | 59.5 | 58.5 | 58.5 |
|  | Al$_2$O$_3$ | 15.2 | 15.2 | 15.2 | 14.9 | 15.7 |
|  | B$_2$O$_3$ | 10.2 | 11.2 | 11.2 | 11.2 | 10.7 |
|  | CaO | 7.7 | 7.7 | 7.7 | 7.7 | 7.7 |
|  | SrO | 7.0 | 7.0 | 5.0 | 6.3 | 6.0 |
|  | Sb$_2$O$_3$ | 1.0 | 1.0 | 1.0 | 1.0 | 1.0 |
|  | SnO$_2$ | 0.2 | 0.2 | 0.2 | 0.2 | 0.2 |
|  | ZrO$_2$ | 0.2 | 0.2 | 0.2 | 0.2 | 0.2 |
| Density (g/cm$^3$) |  | 2.51 | 2.50 | 2.46 | 2.49 | 2.48 |
| Coefficient of thermal expansion [30-380° C.] (×10$^{-7}$/° C.) |  | 41 | 41 | 39 | 40 | 40 |
| Viscosity | Strain point (° C.) | 658 | 650 | 656 | 652 | 659 |
|  | Annealing temperature (° C.) | 710 | 701 | 710 | 703 | 712 |
|  | Softening temperature (° C.) | 933 | 922 | 942 | 928 | 939 |

TABLE 5-continued

|  | | Example | | | | |
|---|---|---|---|---|---|---|
|  | | 21 | 22 | 23 | 24 | 25 |
| $10^{4.0}$ (° C.) | | 1252 | 1235 | 1266 | 1248 | 1257 |
| $10^{2.5}$ (° C.) | | 1522 | 1502 | 1539 | 1519 | 1526 |
| Liquidus temperature (° C.) | | 1090 | 1063 | 1068 | 1073 | 1078 |
| Liquidus viscosity (dPa · s) | | $10^{5.5}$ | $10^{5.6}$ | $10^{5.8}$ | $10^{5.6}$ | $10^{5.7}$ |
| Devitrification resistance to Sn | | ○ | ○ | ○ | ○ | ○ |
| Devitrification resistance to Zr | | ○ | ○ | ○ | ○ | ○ |
| Young's modulus (GPa) | | 73 | 72 | 71 | 71 | 72 |
| Specific modulus (GPa/g · cm$^{-3}$) | | 29 | 29 | 29 | 29 | 29 |
| Change in appearance 63BHF 20° C. 30 min | | ○ | ○ | ○ | ○ | ○ |

TABLE 6

|  | | Example | | | | |
|---|---|---|---|---|---|---|
|  | | 26 | 27 | 28 | 29 | 30 |
| Glass composition (wt %) | SiO$_2$ | 60.5 | 61.0 | 56.5 | 56.5 | 59.0 |
|  | Al$_2$O$_3$ | 15.2 | 15.2 | 15.2 | 15.2 | 15.7 |
|  | B$_2$O$_3$ | 11.2 | 11.2 | 11.2 | 11.2 | 11.2 |
|  | CaO | 7.7 | 7.7 | 7.7 | 8.7 | 7.7 |
|  | SrO | 4.0 | 3.5 | 8.0 | 7.0 | 5.0 |
|  | Sb$_2$O$_3$ | 1.0 | 1.0 | 1.0 | 1.0 | 1.0 |
|  | SnO$_2$ | 0.2 | 0.2 | 0.2 | 0.2 | 0.2 |
|  | ZrO$_2$ | 0.2 | 0.2 | 0.2 | 0.2 | 0.2 |
| Density (g/cm$^3$) | | 2.44 | 2.42 | 2.53 | 2.52 | 2.46 |
| Coefficient of thermal expansion [30-380° C.] (×10$^{-7}$/° C.) | | 37 | 37 | 42 | 43 | 39 |
| Viscosity | Strain point (° C.) | 658 | 661 | 650 | 650 | 657 |
|  | Annealing temperature (° C.) | 714 | 717 | 700 | 699 | 711 |
|  | Softening temperature (° C.) | 953 | 958 | 914 | 909 | 944 |
|  | $10^{4.0}$ (° C.) | 1280 | 1288 | 1222 | 1215 | 1266 |
|  | $10^{2.5}$ (° C.) | 1560 | 1564 | 1484 | 1475 | 1537 |
| Liquidus temperature (° C.) | | 1085 | 1090 | 1069 | 1073 | 1074 |
| Liquidus viscosity (dPa · s) | | $10^{5.8}$ | $10^{5.8}$ | $10^{5.4}$ | $10^{5.3}$ | $10^{5.8}$ |
| Devitrification resistance to Sn | | ○ | ○ | ○ | ○ | ○ |
| Devitrification resistance to Zr | | ○ | ○ | ○ | ○ | ○ |
| Young's modulus (GPa) | | 71 | 71 | 72 | 73 | 72 |
| Specific modulus (GPa/g · cm$^{-3}$) | | 29 | 29 | 29 | 29 | 29 |
| Change in appearance 63BHF 20° C. 30 min | | ○ | ○ | ○ | ○ | ○ |

TABLE 7

|  | | Example | | | | |
|---|---|---|---|---|---|---|
|  | | 31 | 32 | 33 | 34 | 35 |
| Glass composition (wt %) | SiO$_2$ | 60.0 | 59.0 | 59.5 | 60.0 | 59.5 |
|  | Al$_2$O$_3$ | 14.7 | 15.2 | 15.2 | 15.2 | 15.7 |
|  | B$_2$O$_3$ | 11.2 | 11.2 | 10.7 | 10.7 | 11.2 |
|  | MgO | — | 0.5 | 0.5 | — | — |
|  | CaO | 7.7 | 7.7 | 7.7 | 7.7 | 7.7 |
|  | SrO | 5.0 | 5.0 | 5.0 | 5.0 | 4.5 |
|  | Sb$_2$O$_3$ | 1.0 | 1.0 | 1.0 | 1.0 | 1.0 |
|  | SnO$_2$ | 0.2 | 0.2 | 0.2 | 0.2 | 0.2 |
|  | ZrO$_2$ | 0.2 | 0.2 | 0.2 | 0.2 | 0.2 |
| Density (g/cm$^3$) | | 2.46 | 2.47 | 2.47 | 2.46 | 2.45 |
| Coefficient of thermal expansion [30-380° C.] (×10$^{-7}$/° C.) | | 39 | 39 | 39 | 39 | 38 |
| Viscosity | Strain point (° C.) | 654 | 654 | 656 | 660 | 659 |
|  | Annealing temperature (° C.) | 708 | 706 | 709 | 714 | 714 |
|  | Softening temperature (° C.) | 941 | 935 | 940 | 949 | 950 |

TABLE 7-continued

|  | Example | | | | |
|---|---|---|---|---|---|
|  | 31 | 32 | 33 | 34 | 35 |
| $10^{4.0}$ (° C.) | 1273 | 1257 | 1261 | 1273 | 1273 |
| $10^{2.5}$ (° C.) | 1547 | 1526 | 1532 | 1550 | 1542 |
| Liquidus temperature (° C.) | 1077 | 1107 | 1085 | 1085 | 1070 |
| Liquidus viscosity (dPa · s) | $10^{5.8}$ | $10^{5.3}$ | $10^{5.6}$ | $10^{5.7}$ | $10^{5.9}$ |
| Devitrification resistance to Sn | ○ | ○ | ○ | ○ | ○ |
| Devitrification resistance to Zr | ○ | ○ | ○ | ○ | ○ |
| Young's modulus (GPa) | 71 | 72 | 73 | 72 | 72 |
| Specific modulus (GPa/g · cm$^{-3}$) | 29 | 29 | 29 | 29 | 29 |
| Change in appearance 63BHF 20° C. 30 min | ○ | ○ | ○ | ○ | ○ |

TABLE 8

|  |  | Example | | | | |
|---|---|---|---|---|---|---|
|  |  | 36 | 37 | 38 | 39 | 40 |
| Glass composition (wt %) | SiO$_2$ | 59.5 | 59.5 | 60.3 | 60.0 | 60.8 |
|  | Al$_2$O$_3$ | 15.2 | 14.7 | 15.4 | 15.7 | 14.9 |
|  | B$_2$O$_3$ | 11.2 | 10.7 | 11.3 | 11.3 | 10.8 |
|  | MgO | — | — | — | 0.5 | 0.3 |
|  | CaO | 8.7 | 7.7 | 7.8 | 7.8 | 8.0 |
|  | SrO | 4.0 | 6.0 | 5.0 | 4.5 | 5.0 |
|  | Sb$_2$O$_3$ | 1.0 | 1.0 | — | — | — |
|  | SnO$_2$ | 0.2 | 0.2 | 0.2 | 0.2 | 0.2 |
|  | ZrO$_2$ | 0.2 | 0.2 | — | — | — |
| Density (g/cm$^3$) |  | 2.46 | 2.48 | 2.44 | 2.44 | 2.45 |
| Coefficient of thermal expansion [30-380° C.] (×10$^{-7}$/° C.) |  | 39 | 40 | 38 | 38 | 39 |
| Viscosity | Strain point (° C.) | 655 | 654 | 660 | 659 | 659 |
|  | Annealing temperature (° C.) | 708 | 707 | 712 | 712 | 711 |
|  | Softening temperature (° C.) | 938 | 936 | 943 | 942 | 940 |
|  | $10^{4.0}$ (° C.) | 1259 | 1260 | 1268 | 1262 | 1267 |
|  | $10^{2.5}$ (° C.) | 1531 | 1537 | 1540 | 1531 | 1540 |
| Liquidus temperature (° C.) |  | 1091 | 1097 | 1067 | 1078 | 1079 |
| Liquidus viscosity (dPa · s) |  | $10^{5.5}$ | $10^{5.4}$ | $10^{5.9}$ | $10^{5.7}$ | $10^{5.7}$ |
| Devitrification resistance to Sn |  | ○ | ○ | ○ | ○ | ○ |
| Devitrification resistance to Zr |  | ○ | ○ | ○ | ○ | ○ |
| Young's modulus (GPa) |  | 72 | 72 | 72 | 72 | 73 |
| Specific modulus (GPa/g · cm$^{-3}$) |  | 29 | 29 | 29 | 30 | 30 |
| Change in appearance 63BHF 20° C. 30 min |  | ○ | ○ | ○ | ○ | ○ |

TABLE 9

|  |  | Example | | | | |
|---|---|---|---|---|---|---|
|  |  | 41 | 42 | 43 | 44 | 45 |
| Glass composition (wt %) | SiO$_2$ | 61.3 | 61.0 | 61.0 | 60.7 | 60.5 |
|  | Al$_2$O$_3$ | 14.9 | 15.0 | 15.0 | 15.0 | 15.0 |
|  | B$_2$O$_3$ | 10.8 | 10.5 | 10.5 | 10.8 | 10.5 |
|  | MgO | 0.3 | 0.3 | — | 0.3 | 0.3 |
|  | CaO | 8.0 | 8.0 | 8.0 | 8.0 | 8.0 |
|  | SrO | 4.5 | 5.0 | 5.3 | 5.0 | 5.5 |
|  | SnO$_2$ | 0.2 | 0.2 | 0.2 | 0.2 | 0.2 |
| Density (g/cm$^3$) |  | 2.44 | 2.45 | 2.45 | 2.45 | 2.46 |
| Coefficient of thermal expansion [30-380° C.] (×10$^{-7}$/° C.) |  | 38 | 39 | 39 | 39 | 39 |
| Viscosity | Strain point (° C.) | 661 | 662 | 663 | 659 | 661 |
|  | Annealing temperature (° C.) | 713 | 714 | 715 | 711 | 712 |
|  | Softening temperature (° C.) | 944 | 943 | 945 | 938 | 937 |

TABLE 9-continued

|  |  | Example |  |  |  |  |
|---|---|---|---|---|---|---|
|  |  | 41 | 42 | 43 | 44 | 45 |
| $10^{4.0}$ (° C.) | | 1273 | 1269 | 1271 | 1262 | 1258 |
| $10^{2.5}$ (° C.) | | 1548 | 1543 | 1548 | 1537 | 1533 |
| Liquidus temperature (° C.) | | 1100 | 1108 | 1114 | 1097 | 1107 |
| Liquidus viscosity (dPa·s) | | $10^{5.5}$ | $10^{5.4}$ | $10^{5.4}$ | $10^{5.5}$ | $10^{5.3}$ |
| Devitrification resistance to Sn | | ○ | ○ | ○ | ○ | ○ |
| Devitrification resistance to Zr | | ○ | ○ | ○ | ○ | ○ |
| Young's modulus (GPa) | | 73 | 73 | 73 | 73 | 73 |
| Specific modulus (GPa/g·cm$^{-3}$) | | 30 | 30 | 30 | 30 | 30 |
| Change in appearance 63BHF 20° C. 30 min | | ○ | ○ | ○ | ○ | ○ |

15

TABLE 10

|  |  | Example |  |  |  |  |
|---|---|---|---|---|---|---|
|  |  | 46 | 47 | 48 | 49 | 50 |
| Glass composition (wt %) | SiO$_2$ | 60.8 | 60.8 | 60.8 | 60.8 | 60.8 |
| | Al$_2$O$_3$ | 15.3 | 15.3 | 15.3 | 15.7 | 15.3 |
| | B$_2$O$_3$ | 9.4 | 9.4 | 9.8 | 9.4 | 9.4 |
| | CaO | 7.7 | 7.7 | 7.7 | 7.7 | 8.1 |
| | SrO | 6.0 | 6.4 | 6.0 | 6.0 | 6.0 |
| | ZnO | 0.4 | — | — | — | — |
| | SnO$_2$ | 0.2 | 0.2 | 0.2 | 0.2 | 0.2 |
| | ZrO$_2$ | 0.2 | 0.2 | 0.2 | 0.2 | 0.2 |
| Density (g/cm$^3$) | | 2.48 | 2.48 | 2.47 | 2.47 | 2.48 |
| Coefficient of thermal expansion [30-380° C.] ($\times 10^{-7}$/° C.) | | 39 | 40 | 39 | 39 | 40 |
| Viscosity | Strain point (° C.) | 670 | 672 | 670 | 675 | 670 |
| | Annealing temperature (° C.) | 722 | 724 | 722 | 728 | 722 |
| | Softening temperature (° C.) | 952 | 952 | 952 | 958 | 948 |
| | $10^{4.0}$ (° C.) | 1276 | 1271 | 1273 | 1280 | 1267 |
| | $10^{2.5}$ (° C.) | 1549 | 1549 | 1552 | 1556 | 1543 |
| Liquidus temperature (° C.) | | 1115 | 1120 | 1115 | 1115 | 1130 |
| Liquidus viscosity (dPa·s) | | $10^{5.4}$ | $10^{5.3}$ | $10^{5.4}$ | $10^{5.5}$ | $10^{5.2}$ |
| Devitrification resistance to Sn | | ○ | ○ | ○ | ○ | ○ |
| Devitrification resistance to Zr | | ○ | ○ | ○ | ○ | ○ |
| Change in appearance 63BHF 20° C. 30 min | | ○ | ○ | ○ | ○ | ○ |

TABLE 11

|  |  | Example |  |  |  |  |
|---|---|---|---|---|---|---|
|  |  | 51 | 52 | 53 | 54 | 55 |
| Glass composition (wt %) | SiO$_2$ | 60.8 | 60.8 | 60.5 | 59.5 | 59.5 |
| | Al$_2$O$_3$ | 15.3 | 15.3 | 15.2 | 16.2 | 15.2 |
| | B$_2$O$_3$ | 9.4 | 9.4 | 10.2 | 10.2 | 11.2 |
| | CaO | 8.6 | 7.1 | 7.7 | 7.7 | 7.7 |
| | SrO | 5.5 | 7.0 | 6.0 | 6.0 | 6.0 |
| | SnO$_2$ | 0.2 | 0.2 | 0.2 | 0.2 | 0.2 |
| | ZrO$_2$ | 0.2 | 0.2 | 0.2 | 0.2 | 0.2 |
| Density (g/cm$^3$) | | 2.48 | 2.48 | 2.47 | 2.47 | 2.46 |
| Coefficient of thermal expansion [30-380° C.] ($\times 10^{-7}$/° C.) | | 40 | 39 | 39 | 39 | 39 |
| Viscosity | Strain point (° C.) | 670 | 671 | 664 | 669 | 660 |
| | Annealing temperature (° C.) | 721 | 723 | 717 | 722 | 711 |
| | Softening temperature (° C.) | 947 | 954 | 947 | 952 | 938 |
| | $10^{4.0}$ (° C.) | 1263 | 1280 | 1269 | 1268 | 1255 |
| | $10^{2.5}$ (° C.) | 1538 | 1561 | 1546 | 1537 | 1537 |
| Liquidus temperature (° C.) | | 1125 | 1125 | 1100 | 1105 | 1075 |
| Liquidus viscosity (dPa·s) | | $10^{5.2}$ | $10^{5.4}$ | $10^{5.5}$ | $10^{5.5}$ | $10^{5.7}$ |

TABLE 11-continued

|  | Example | | | | |
|---|---|---|---|---|---|
|  | 51 | 52 | 53 | 54 | 55 |
| Devitrification resistance to Sn | ○ | ○ | ○ | ○ | ○ |
| Devitrification resistance to Zr | ○ | ○ | ○ | ○ | ○ |
| Change in appearance 63BHF 20° C. 30 min | ○ | ○ | ○ | ○ | ○ |

TABLE 12

|  |  | Example | | | | |
|---|---|---|---|---|---|---|
|  |  | 56 | 57 | 58 | 59 | 60 |
| Glass composition (wt %) | $SiO_2$ | 59.5 | 58.5 | 60.5 | 59.5 | 59.5 |
|  | $Al_2O_3$ | 15.2 | 15.2 | 15.2 | 14.9 | 15.7 |
|  | $B_2O_3$ | 10.2 | 11.2 | 11.2 | 11.2 | 10.7 |
|  | CaO | 7.7 | 7.7 | 7.7 | 7.7 | 7.7 |
|  | SrO | 7.0 | 7.0 | 5.0 | 6.3 | 6.0 |
|  | $SnO_2$ | 0.2 | 0.2 | 0.2 | 0.2 | 0.2 |
|  | $ZrO_2$ | 0.2 | 0.2 | 0.2 | 0.2 | 0.2 |
| Density ($g/cm^3$) |  | 2.49 | 2.49 | 2.44 | 2.47 | 2.47 |
| Coefficient of thermal expansion [30-380° C.] ($\times 10^{-7}$/° C.) |  | 40 | 41 | 38 | 40 | 39 |
| Viscosity | Strain point (° C.) | 664 | 656 | 662 | 658 | 665 |
|  | Annealing temperature (° C.) | 715 | 706 | 715 | 708 | 717 |
|  | Softening temperature (° C.) | 938 | 927 | 947 | 933 | 944 |
|  | $10^{4.0}$ (° C.) | 1256 | 1239 | 1270 | 1252 | 1261 |
|  | $10^{2.5}$ (° C.) | 1531 | 1511 | 1548 | 1528 | 1535 |
| Liquidus temperature (° C.) |  | 1095 | 1070 | 1075 | 1080 | 1085 |
| Liquidus viscosity (dPa · s) |  | $10^{5.5}$ | $10^{5.6}$ | $10^{5.8}$ | $10^{5.6}$ | $10^{5.7}$ |
| Devitrification resistance to Sn |  | ○ | ○ | ○ | ○ | ○ |
| Devitrification resistance to Zr |  | ○ | ○ | ○ | ○ | ○ |
| Change in appearance 63BHF 20° C. 30 min |  | ○ | ○ | ○ | ○ | ○ |

TABLE 13

|  |  | Example | | | | |
|---|---|---|---|---|---|---|
|  |  | 61 | 62 | 63 | 64 | 65 |
| Glass composition (wt %) | $SiO_2$ | 61.5 | 62.0 | 57.5 | 57.5 | 60.0 |
|  | $Al_2O_3$ | 15.2 | 15.2 | 15.2 | 15.2 | 15.7 |
|  | $B_2O_3$ | 11.2 | 11.2 | 11.2 | 11.2 | 11.2 |
|  | CaO | 7.7 | 7.7 | 7.7 | 8.7 | 7.7 |
|  | SrO | 4.0 | 3.5 | 8.0 | 7.0 | 5.0 |
|  | $SnO_2$ | 0.2 | 0.2 | 0.2 | 0.2 | 0.2 |
|  | $ZrO_2$ | 0.2 | 0.2 | 0.2 | 0.2 | 0.2 |
| Density ($g/cm^3$) |  | 2.42 | 2.41 | 2.50 | 2.50 | 2.44 |
| Coefficient of thermal expansion [30-380° C.] ($\times 10^{-7}$/° C.) |  | 37 | 36 | 42 | 42 | 38 |
| Viscosity | Strain point (° C.) | 664 | 667 | 656 | 656 | 663 |
|  | Annealing temperature (° C.) | 719 | 722 | 705 | 704 | 716 |
|  | Softening temperature (° C.) | 958 | 963 | 919 | 914 | 949 |
|  | $10^{4.0}$ (° C.) | 1284 | 1292 | 1226 | 1219 | 1270 |
|  | $10^{2.5}$ (° C.) | 1569 | 1573 | 1493 | 1484 | 1546 |
| Liquidus temperature (° C.) |  | 1090 | 1095 | 1075 | 1080 | 1080 |
| Liquidus viscosity (dPa · s) |  | $10^{5.8}$ | $10^{5.8}$ | $10^{5.4}$ | $10^{5.3}$ | $10^{5.8}$ |
| Devitrification resistance to Sn |  | ○ | ○ | ○ | ○ | ○ |
| Devitrification resistance to Zr |  | ○ | ○ | ○ | ○ | ○ |
| Change in appearance 63BHF 20° C. 30 min |  | ○ | ○ | ○ | ○ | ○ |

TABLE 14

| | | Example | | | | |
|---|---|---|---|---|---|---|
| | | 66 | 67 | 68 | 69 | 70 |
| Glass composition (wt %) | $SiO_2$ | 61.0 | 60.0 | 60.5 | 61.0 | 60.5 |
| | $Al_2O_3$ | 14.7 | 15.2 | 15.2 | 15.2 | 15.7 |
| | $B_2O_3$ | 11.2 | 11.2 | 10.7 | 10.7 | 11.2 |
| | MgO | — | 0.5 | 0.5 | — | — |
| | CaO | 7.7 | 7.7 | 7.7 | 7.7 | 7.7 |
| | SrO | 5.0 | 5.0 | 5.0 | 5.0 | 4.5 |
| | $SnO_2$ | 0.2 | 0.2 | 0.2 | 0.2 | 0.2 |
| | $ZrO_2$ | 0.2 | 0.2 | 0.2 | 0.2 | 0.2 |
| Density (g/cm$^3$) | | 2.44 | 2.45 | 2.45 | 2.44 | 2.43 |
| Coefficient of thermal expansion [30-380° C.] (×10$^{-7}$/° C.) | | 38 | 39 | 38 | 38 | 38 |
| Viscosity | Strain point (° C.) | 660 | 660 | 662 | 666 | 665 |
| | Annealing temperature (° C.) | 713 | 711 | 714 | 719 | 719 |
| | Softening temperature (° C.) | 946 | 940 | 945 | 954 | 955 |
| | $10^{4.0}$ (° C.) | 1277 | 1261 | 1265 | 1277 | 1277 |
| | $10^{2.5}$ (° C.) | 1556 | 1535 | 1541 | 1559 | 1551 |
| Liquidus temperature (° C.) | | 1080 | 1110 | 1090 | 1090 | 1075 |
| Liquidus viscosity (dPa · s) | | $10^{5.8}$ | $10^{5.3}$ | $10^{5.6}$ | $10^{5.7}$ | $10^{5.9}$ |
| Devitrification resistance to Sn | | ○ | ○ | ○ | ○ | ○ |
| Devitrification resistance to Zr | | ○ | ○ | ○ | ○ | ○ |
| Change in appearance 63BHF 20° C. 30 min | | ○ | ○ | ○ | ○ | ○ |

TABLE 15

| | | Example | | | | |
|---|---|---|---|---|---|---|
| | | 71 | 72 | 73 | 74 | 75 |
| Glass composition (wt %) | $SiO_2$ | 60.5 | 60.5 | 60.3 | 60.0 | 60.8 |
| | $Al_2O_3$ | 15.2 | 14.7 | 15.4 | 15.7 | 14.9 |
| | $B_2O_3$ | 11.2 | 10.7 | 11.3 | 11.3 | 10.8 |
| | MgO | — | — | — | 0.5 | 0.3 |
| | CaO | 8.7 | 7.7 | 7.8 | 7.8 | 8.0 |
| | SrO | 4.0 | 6.0 | 5.0 | 4.5 | 5.0 |
| | $SnO_2$ | 0.2 | 0.2 | 0.2 | 0.2 | 0.2 |
| | $ZrO_2$ | 0.2 | 0.2 | — | — | — |
| Density (g/cm$^3$) | | 2.44 | 2.46 | 2.44 | 2.44 | 2.45 |
| Coefficient of thermal expansion [30-380° C.] (×10$^{-7}$/° C.) | | 39 | 39 | 38 | 38 | 39 |
| Viscosity | Strain point (° C.) | 661 | 660 | 660 | 659 | 659 |
| | Annealing temperature (° C.) | 713 | 712 | 712 | 712 | 711 |
| | Softening temperature (° C.) | 943 | 941 | 943 | 942 | 940 |
| | $10^{4.0}$ (° C.) | 1263 | 1264 | 1268 | 1262 | 1267 |
| | $10^{2.5}$ (° C.) | 1540 | 1546 | 1540 | 1531 | 1540 |
| Liquidus temperature (° C.) | | 1095 | 1100 | 1065 | 1080 | 1080 |
| Liquidus viscosity (dPa · s) | | $10^{5.5}$ | $10^{5.4}$ | $10^{5.9}$ | $10^{5.7}$ | $10^{5.7}$ |
| Devitrification resistance to Sn | | ○ | ○ | ○ | ○ | ○ |
| Devitrification resistance to Zr | | ○ | ○ | ○ | ○ | ○ |
| Young's modulus (GPa) | | — | — | 72 | 72 | 73 |
| Specific modulus (GPa/g · cm$^{-3}$) | | — | — | 29 | 30 | 30 |
| Change in appearance 63BHF 20° C. 30 min | | ○ | ○ | ○ | ○ | ○ |

TABLE 16

| | | Example | | | |
|---|---|---|---|---|---|
| | | 76 | 77 | 78 | 79 |
| Glass composition | $SiO_2$ | 60.1 | 61.3 | 60.0 | 60.0 |
| | $Al_2O_3$ | 14.8 | 15.1 | 16.7 | 16.7 |
| (wt %) | $B_2O_3$ | 11.7 | 9.9 | 9.8 | 9.8 |
| | MgO | 0.3 | 0.3 | 0.3 | 0.8 |
| | CaO | 7.9 | 8.1 | 8.0 | 8.0 |

TABLE 16-continued

| | | Example | | | |
|---|---|---|---|---|---|
| | | 76 | 77 | 78 | 79 |
| | SrO | 5.0 | 5.1 | 5.0 | 4.5 |
| | SnO$_2$ | 0.2 | 0.2 | 0.2 | 0.2 |
| Density (g/cm$^3$) | | 2.44 | 2.46 | 2.46 | 2.46 |
| Coefficient of thermal expansion [30-380° C.] (×10$^{-7}$/° C.) | | 38 | 38 | 38 | 38 |
| Viscosity | Strain point (° C.) | 655 | 665 | 672 | 673 |
| | Annealing temperature (° C.) | 706 | 718 | 724 | 725 |
| | Softening temperature (° C.) | 930 | 948 | 952 | 943 |
| | 10$^{4.0}$ (° C.) | 1253 | 1271 | 1263 | 1256 |
| | 10$^{2.5}$ (° C.) | 1527 | 1546 | 1526 | 1519 |
| Liquidus temperature (° C.) | | 1086 | 1117 | — | — |
| Liquidus viscosity (dPa · s) | | ○ | ○ | ○ | ○ |
| Devitrification resistance to Sn | | ○ | ○ | ○ | ○ |
| Devitrification resistance to Zr | | 72 | 74 | 74 | 75 |
| Young's modulus (GPa) | | 29 | 30 | 30 | 31 |
| Specific modulus (GPa/g · cm$^{-3}$) | | — | — | 0.8 | 0.8 |
| Change in appearance 63BHF 20° C. 30 min | | ○ | ○ | ○ | ○ |

TABLE 17

| | | Comparative example | |
|---|---|---|---|
| | | 80 | 81 |
| Glass composition (wt %) | SiO$_2$ | 61.0 | 59.8 |
| | Al$_2$O$_3$ | 16.5 | 15.3 |
| | B$_2$O$_3$ | 7.0 | 9.8 |
| | MgO | 3.0 | 0.4 |
| | CaO | 6.0 | 6.0 |
| | SrO | 6.5 | 6.0 |
| | BaO | — | 2.5 |
| | SnO$_2$ | — | 0.2 |
| Density (g/cm$^3$) | | 2.52 | 2.52 |
| Coefficient of thermal expansion [30-380° C.] (×10$^{-7}$/° C.) | | 38 | 37 |
| Viscosity | Strain point (° C.) | 667 | 655 |
| | Annealing temperature (° C.) | 713 | 705 |
| | Softening temperature (° C.) | 950 | 951 |
| | 10$^{4.0}$ (° C.) | — | — |
| | 10$^{2.5}$ (° C.) | 1540 | 1560 |
| Liquidus temperature (° C.) | | 1140 | 1060 |
| Liquidus viscosity (dPa · s) | | 10$^{5.0}$ | 10$^{6.1}$ |
| Young's modulus (GPa) | | 76 | 71 |
| Specific modulus (GPa/g · cm$^{-3}$) | | 31 | 29 |
| Vickers hardness | | 600 | 600 |
| Corrosion amount 10% HCl 80° C. 24 hrs (mg/cm$^2$) | | 0.3 | 0.5 |
| Corrosion amount 63BHF 20° C. 30 min (mg/cm$^2$) | | 0.9 | 0.7 |
| Change in appearance 63BHF 20° C. 30 min | | X | ○ |

Each glass sample was produced as follows. A batch in which raw materials were mixed to yield predetermined proportions was placed in a platinum crucible, melted at 1600° C. for 24 hours, poured on a carbon plate, and formed into a plate shape. Various properties, such as densities, strain points, high-temperature viscosities, and the like of the glass samples were measured.

The density was measured by a well-known Archimedes' method based on JIS Z8807. The strain points, annealing temperatures, and softening temperatures were measured based on JIS R3103.

As the coefficients of thermal expansion, average coefficients of thermal expansion in the temperature range from 30 to 380° C. were measured with a dilatometer based on JIS R3102.

A temperature in a high-temperature viscosity of 10$^{4.0}$ poise and a temperature in a high-temperature viscosity of 10$^{2.5}$ poise were measured using a known platinum ball pulling-up method.

The liquidus temperature refers to the maximum temperature at which devitrification (crystalline foreign substance) was observed in glass. The measurement was performed by crushing each glass sample, passing the crushed sample glass through a standard 30-mesh sieve (500-μm openings), placing the remaining glass powders on a 50-mesh standard sieve (300-μm openings) in a platinum boat, and holding the same in a temperature gradient furnace for 24 hours. The liquidus viscosity refers to a value obtained by measuring the glass viscosity at a liquidus temperature by the well-known platinum ball pulling-up method.

The liquidus temperature of glass to which SnO$_2$ was added (devitrification resistance to SnO$_2$ in tables) refers to a temperature at which crystals were precipitated. The measurement was performed by adding SnO$_2$ to a raw material batch until the content of SnO$_2$ level reach 0.3% in the glass composition, melting and forming glass under the same conditions as above, crushing the obtained glass sample, passing the crushed glass sample through a 30-mesh standard sieve (500-μm), placing the remaining glass powders on a 50-mesh standard sieve mesh (300-μm) in a platinum boat, and holding the same in a temperature gradient furnace for 1 week. Subsequently, glass showed no devitrification at 1150° C. was graded as "○" and glass showed devitrification at 1150° C. was graded as "x". The clarity of glass was evaluated in parallel to the above evaluation, which showed that no bubble defect was observed in glass when SnO$_2$ was added until the content reach 0.3%.

The liquidus temperature of glass to which ZrO$_2$ was added (devitrification resistance to ZrO$_2$ in tables) refers to a temperature at which crystals were precipitated. The measurement was performed by adding ZrO$_2$ whose content level equivalent to 0.5% in the glass composition to a raw material batch, melting and forming glass under the same conditions as above, crushing the obtained glass sample, passing the crushed glass sample through a 30-mesh standard sieve (500-μm), placing the remaining glass powders on a 50-mesh standard sieve mesh (300-μm) in a platinum boat, and holding the same in a temperature gradient furnace for 1 week. Subsequently, glass showed no devitrification at 1150° C. was graded as "○" and glass showed devitrification at 1150° C. was graded as "x".

The Young's modulus was measured by a resonance method based on JIS R1602. The specific modulus was calculated by dividing the Young's modulus by the viscosity.

The vickers hardness was measured by a method following to JIS Z2244-1992.

The chemical resistance was measured by the following procedure after each glass sample was processed into 25×30×1 mm, and both sides of each sample were optically polished. Weight W$_1$ of each glass sample was measured beforehand, and weight W$_2$ of each glass sample was measured again after each glass sample was immersed in a chemical solution whose concentration was adjusted to a predetermined concentration, at a predetermined temperature for a predetermined period of time. The amount of corrosion (SW/S) was calculated by dividing an amount of weight loss (ΔW=W$_1$−W$_2$) by a surface area S of each glass sample before measurement. Each glass was observed for cloudiness of the glass surface after the chemical treatment. The glass sample whose glass surface became: cloudy and showed cracks was graded as "x"; slightly cloudy and showed roughness was graded as "Δ"; and no change was graded as "○". With respect to the chemical solutions and the processing conditions, the acid resistance was evaluated with a 24-hour treatment using an aqueous 10% of hydrochloric acid solution at 80° C. The BHF resistance was evaluated with a 30-minute treatment using a 63BHF solution (HF: 6%, $NH_4F$: 30%) at 20° C.

Each glass sample of Examples of the present invention had a density of 2.41 to 2.53 $g/cm^3$, coefficient of thermal expansion of 36 to $43 \times 10^{-7}/°C$., strain point of 643 to 675° C., annealing temperature of 696 to 728° C., softening temperature of 909 to 963° C., temperature at a high-temperature viscosity of $10^{4.0}$ dPa·s of 1215 to 1292° C., a temperature at a high-temperature viscosity of $10^{2.5}$ dPa·s of 1475 to 1573° C., liquidus temperature of 1063 to 1125° C., liquidus viscosity of $10^{5.2}$ to $10^{6.1}$ dPa·s, Young's modulus of 70 to 75 GPa, and specific modulus of 29 to 31 $GPa/g·cm^{-3}$. In addition, the Vickers hardness was 590 to 610, the amount of corrosion when the glass sample was immersed in an aqueous 10% of HCl solution of 80° C. for 24 hours was 0.4 to 0.6 $mg/cm^2$, and the amount of corrosion when the glass sample was immersed in a 63BHF solution of 20° C. for 30 minutes was 0.6 to 0.8 $mg/cm^2$. Moreover, no change in appearance was observed. The devitrification resistance to Sn and devitrification resistance to Zr were also favorable.

In view of the above, in each glass sample of Examples of the present invention, no environmental impact chemical substance was contained or the content thereof is low. Thus, each glass sample of Examples of the present invention was possibly considered to be as glass that takes the environment into consideration. Because the density was 2.54 $g/cm^3$ or lower, a light-weight glass substrate was achieved. Because the coefficient of thermal expansion is within the range of 35 to $45 \times 10^{-7}/°C$., the matching with various thin films was excellent. Because the strain point is 640° C. or higher, glass was unlikely to be thermally contracted due to a heat treatment in a display manufacturing process. Considering that the liquidus temperature was 1200° C. or lower and the liquidus viscosity was $10^{5.2}$ dPa·s or higher, the devitrification resistance and glass formability were outstanding. Because the temperature at a high-temperature viscosity of $10^{2.5}$ dPa·s was 1580° C. or lower, the melting of glass and glass formability were excellent, and moreover, the chemical resistances, especially the BHF resistance and acid resistance, were outstanding.

In the glass sample No. 80 of the Comparative Example of the present invention, the devitrification resistance and chemical resistance were inferior to those of Examples of the present invention. Because the glass sample No. 81 of the Comparative Example of the present invention contains 2.5% of BaO, influence on the environment is concerned.

Further, a glass substrate for displays with a substrate size of 900 mm×1100 mm and with a thickness of 0.5 mm was obtained by melting the glass sample No. 44 of Examples of the present invention in a melting furnace, and forming the resultant into a glass substrate according to the overflow downdraw glass formation method. The curvature of the obtained glass substrate was 0.05% or lower, waviness (WCA) was 0.1 μm or lower, and surface roughness (Ra) was 50 Å or lower (cut-off $\lambda_c$: 9 μm). The obtained glass substrate had excellent surface quality, and thus was suitable as a glass substrate for LCDs. In the formation according to the overflow downdraw glass forming method, the surface quality of the glass substrate was adjusted by suitably adjusting the rate of a drawing roller, rate of a cooling roller, temperature distribution of a heating system, temperature of molten glass, flow amount of glass, rate of plate drawing, rotation numbers of a stirrer, etc. The "curvature" was measured by placing the glass substrate on an optical surface plate using a feeler gauge described in JIS B-7524. The "waviness" refers to a value obtained by measuring WCA (filtered centerline waviness) according to a method described in JIS B-0610 using a stylus type surface roughness measuring instrument. This measurement was performed according to a method following to SEMI STD D15-1296 "FPD glass substrate surface waviness measurement method". The measurement of cut-off was 0.8 to 8 mm and the sample was measured at a length of 300 mm in the direction perpenducuclar to the drawing direction of the glass substrate. The "average surface roughness (Ra)" refers to a value measured by a method according to SEMI D7-94 "FPD glass substrate surface roughness measurement method".

INDUSTRIAL APPLICABILITY

In the alkali-free glass of the present invention, the content of an environmental impact chemical substance is low, and also the alkali-free glass of the invention which does not substantially contain any environmental impact chemical substance can be provided. Therefore, the alkali-free glass of the present invention is glass that takes the environment into consideration, and recycling of glass substrates can be easily achieved. Moreover, the fear of causing environmental pollution is low. Thus, such an alkali-free glass can be suitably used as a next-generation glass substrate.

Thus, the alkali-free glass of the present invention is suitable as display substrates for liquid crystal displays and organic EL displays, cover glasses for solid state image pickup devices, such as CMOS, substrates for filters and sensors, and the like.

The invention claimed is:

1. An alkali-free glass, comprising a glass composition, in percent by weight based on oxide, of 50 to 68% of $SiO_2$, 10 to 20% of $Al_2O_3$, 8 to 12% of $B_2O_3$, 0 to 3% of MgO, 7.1 to 12% of CaO, 3 to 10% of SrO, 0 to 1% of BaO, 0 to 5% of ZnO, and 0 to 1% of $ZrO_2$, wherein the alkali-free glass is substantially free of alkali metal oxide, $As_2O_3$ and $Sb_2O_3$.

2. An alkali-free glass, comprising a glass composition, in percent by weight based on oxide, of 55 to 65% of $SiO_2$, 12 to 20% of $Al_2O_3$, 8 to 11% of $B_2O_3$, 0 to 1% of MgO, 7.1 to 11% of CaO, 3 to 10% of SrO, 0 to 0.6% of BaO, 0 to 5% of ZnO, 10.1 to 20% of RO, and 0 to 1% of $ZrO_2$, wherein the alkali-free glass is substantially free of alkali metal oxide, $As_2O_3$ and $Sb_2O_3$.

3. An alkali-free glass, comprising a glass composition, in percent by weight based on oxide, of 55 to 65% of $SiO_2$, 13 to 17% of $Al_2O_3$, 8.5 to 10.5% of $B_2O_3$ (10.5% exclusive), 0 to 0.5% of MgO (0.5% exclusive), 7.1 to 11% of CaO, 3 to 7% of SrO, 0 to 1% of ZnO, 10.1 to 20% of RO, and 0 to 1% of $ZrO_2$, wherein the alkali-free glass is substantially free of alkali metal oxide, BaO, $As_2O_3$ and $Sb_2O_3$.

4. The alkali-free glass according to claim 1, which has an average surface roughness (Ra) of 20 Å or lower.

5. The alkali-free glass according to claim 1, which has a waviness of 0.1 μm or lower.

6. The alkali-free glass according to claim 1, which has a plate thickness difference between a maximum plate thickness and a minimum plate thickness of 20 μm or lower.

7. The alkali-free glass according to claim 1, which has a target plate thickness error of 10 μm or lower.

8. The alkali-free glass according to claim 1, which is used for a display.

9. The alkali-free glass according to claim 1, which is used for a liquid crystal display or an organic EL display.

10. The alkali-free glass according to claim 1, which is used for a liquid crystal display for flat televisions.

11. A method of manufacturing the alkali-free glass, comprising forming the alkali-free glass according to claim 1 by an overflow downdraw glass forming method.

12. The alkali-free glass according to claim 1, further comprising, in percent by weight based on oxide, 0.01 to 1% of $SnO_2$.

13. The alkali-free glass according to claim 2, further comprising, in percent by weight based on oxide, 0.01 to 1% of $SnO_2$.

14. The alkali-free glass according to claim 3, further comprising, in percent by weight based on oxide, 0.01 to 1% of $SnO_2$.

15. The alkali-free glass according to claim 1, wherein the $SiO_2$ content ranges from 58 to 65%.

16. The alkali-free glass according to claim 2, wherein the $SiO_2$ content ranges from 58 to 65%.

17. The alkali-free glass according to claim 3, wherein the $SiO_2$ content ranges from 58 to 65%.

18. The alkali-free glass according to claim 1, wherein the CaO content ranges from 8.1 to 11%.

19. The alkali-free glass according to claim 2, wherein the CaO content ranges from 8.1 to 11%.

20. The alkali-free glass according to claim 7, wherein the CaO content ranges from 8.1 to 11%.

* * * * *